(12) United States Patent
Jarvis et al.

(10) Patent No.: US 8,263,906 B2
(45) Date of Patent: Sep. 11, 2012

(54) FOOD WARMING SYSTEM

(75) Inventors: Charles W. Jarvis, Irvine, CA (US);
Pietro Brattoli, Neckartenzlingen (DE);
Jorge Baez, Lake Forest, CA (US); Jeff Nicholson, Long Beach, CA (US)

(73) Assignee: Cambro Manufacturing Company, Huntington Beach, CA (US)

( * ) Notice: Subject to any disclaimer, the term of this patent is extended or adjusted under 35 U.S.C. 154(b) by 387 days.

(21) Appl. No.: 12/777,801

(22) Filed: May 11, 2010

(65) Prior Publication Data
US 2011/0278280 A1 Nov. 17, 2011

(51) Int. Cl.
*F27D 11/00* (2006.01)
*H05B 3/06* (2006.01)
*H05B 3/08* (2006.01)

(52) U.S. Cl. ......... 219/385; 219/386; 219/521; 219/541

(58) Field of Classification Search .................. 219/385, 219/386, 521, 541
See application file for complete search history.

(56) References Cited

U.S. PATENT DOCUMENTS

| | | |
|---|---|---|
| 2,149,643 A | 3/1939 | Tijmstra |
| 3,019,783 A | 2/1962 | Clarke |
| 3,054,395 A | 9/1962 | Torino |
| 3,065,744 A | 11/1962 | Scavullo |
| 3,322,113 A | 5/1967 | Simjian |
| 3,410,989 A | 11/1968 | Laws |
| 3,557,774 A | 1/1971 | Kreis |
| 3,734,077 A | 5/1973 | Murdough |
| 3,814,900 A * | 6/1974 | Frey et al. .......... 219/385 |
| 3,837,330 A | 9/1974 | Lanigan |
| 3,875,370 A | 4/1975 | Williams |
| 3,916,872 A | 11/1975 | Kreis |
| RE28,720 E | 2/1976 | Sedlak |
| 4,059,096 A | 11/1977 | Schneider |
| 4,169,816 A | 10/1979 | Tsien |
| 4,246,884 A | 1/1981 | Vandas |
| 4,266,108 A | 5/1981 | Anderson |
| 4,309,297 A | 1/1982 | Sato |
| 4,378,005 A | 3/1983 | Otto |
| 4,538,054 A | 8/1985 | de la Bretoniere |
| 4,584,466 A | 4/1986 | de Mola |
| 4,596,236 A | 6/1986 | Eide |
| 4,614,852 A | 9/1986 | Matsushita |
| 4,917,076 A | 4/1990 | Nadolph |

(Continued)

FOREIGN PATENT DOCUMENTS

DE 102005016743 10/2006

(Continued)

*Primary Examiner* — Mohsen Ahmadi
(74) *Attorney, Agent, or Firm* — Marcus C. Dawes

(57) ABSTRACT

A pellet warming system includes a charging unit capable of warming a plurality of pellets contemporaneously. Each of the plurality of pellets comprise an internal heating element which resistively heats the body of the pellet from a regulated electrical current that is provided from the charging unit. The charging unit also comprises a controller board with means to control the duration of electric current supplied to each of the pellets as well as means for cycling electrical current to each of the pellets in order to maintain the resistively generated heat. Once heated, each pellet may have comestible goods disposed indirectly thereon through a plate, the pellet maintaining the comestible goods at an elevated temperature for an extended period of time. The charging unit further comprises means for a user to connect their PC to the controller board in order to alter its internal programming and view its operational history.

22 Claims, 30 Drawing Sheets

U.S. PATENT DOCUMENTS

| | | | |
|---|---|---|---|
| 4,982,722 | A | 1/1991 | Wyatt |
| 5,003,159 | A | 3/1991 | Thorson |
| 5,052,369 | A | 10/1991 | Johnson |
| 5,125,391 | A | 6/1992 | Srivastava |
| 5,273,360 | A | 12/1993 | Wyatt |
| 5,428,080 | A | 6/1995 | Miller |
| 5,433,998 | A | 7/1995 | Curzio |
| 5,520,103 | A | 5/1996 | Zielinski |
| 5,565,132 | A | 10/1996 | Salyer |
| 5,603,858 | A | 2/1997 | Wyatt |
| 5,611,328 | A | 3/1997 | McDermott |
| 650,090 | A | 7/1997 | Salyer |
| 5,700,284 | A | 12/1997 | Owens |
| 5,750,628 | A | 5/1998 | Becker |
| 5,786,643 | A | 7/1998 | Wyatt |
| 5,884,006 | A | 3/1999 | Frohlich |
| 5,901,699 | A | 5/1999 | McDermott |
| 5,954,984 | A | 9/1999 | Ablah |
| 6,005,233 | A | 12/1999 | Wyatt |
| 6,021,710 | A | 2/2000 | Violi |
| 6,083,417 | A | 7/2000 | Gomi |
| 6,097,014 | A | 8/2000 | Kirsch |
| 6,108,489 | A | 8/2000 | Frohlich |
| 6,188,053 | B1 | 2/2001 | Wyatt |
| 6,192,703 | B1 | 2/2001 | Salyer |
| 6,232,585 | B1 | 5/2001 | Clothier |
| 6,316,753 | B2 | 11/2001 | Clothier |
| 6,409,942 | B1 | 6/2002 | Narkis |
| 6,452,138 | B1 | 9/2002 | Kochman |
| 6,475,935 | B1 | 11/2002 | Ishizaki |
| 6,482,332 | B1 | 11/2002 | Malach |
| 6,483,087 | B2 | 11/2002 | Gardner |
| 6,501,057 | B1 * | 12/2002 | Jarvis ............................ 219/621 |
| 6,504,135 | B2 | 1/2003 | Clothier et al. |
| 6,570,133 | B1 * | 5/2003 | Grosso, Sr. ................... 219/387 |
| 6,573,484 | B1 * | 6/2003 | Yue .............................. 219/541 |
| 6,635,855 | B1 | 10/2003 | Scaburri |
| 6,653,608 | B1 | 11/2003 | Matsen |
| 6,657,170 | B2 | 12/2003 | Clothier |
| 6,664,520 | B2 | 12/2003 | Clothier |
| 6,670,589 | B2 | 12/2003 | Wyatt |
| 6,677,559 | B2 | 1/2004 | Johnson |
| 6,689,466 | B2 | 2/2004 | Hartmann |
| 6,737,164 | B2 | 5/2004 | Araki |
| 6,765,031 | B2 | 7/2004 | Salyer |
| 6,774,346 | B2 | 8/2004 | Clothier |
| 6,782,599 | B1 | 8/2004 | Sollo |
| 6,793,856 | B2 | 9/2004 | Hartmann |
| 6,802,367 | B1 | 10/2004 | Westbrooks, Jr. |
| 6,822,204 | B2 | 11/2004 | Clothier |
| 6,837,952 | B1 | 1/2005 | Guirman |
| 6,841,764 | B2 | 1/2005 | Fuchs |
| 6,927,249 | B1 | 8/2005 | Lee |
| 6,939,477 | B2 | 9/2005 | Stark |
| 7,051,730 | B2 | 5/2006 | Lin |
| 7,064,307 | B2 | 6/2006 | Harano |
| 7,141,768 | B2 | 11/2006 | Malofsky |
| 7,176,426 | B2 | 2/2007 | Ramirez |
| 7,193,190 | B2 | 3/2007 | Kissel |
| 7,204,015 | B2 | 4/2007 | Kleshchik |
| 7,247,822 | B2 | 7/2007 | Johnston |
| 8,091,472 | B2 * | 1/2012 | Maciejewski et al. .......... 99/483 |
| 2002/0043525 | A1 | 4/2002 | Laken |
| 2003/0094450 | A1 | 5/2003 | Clothier |
| 2004/0065661 | A1 | 4/2004 | Wiegner |
| 2004/0079515 | A1 | 4/2004 | Fieback |
| 2004/0118837 | A1 | 6/2004 | Samuels |
| 2005/0011883 | A1 | 1/2005 | Clothier |
| 2005/0088272 | A1 | 4/2005 | Yoshikawa |
| 2005/0184059 | A1 | 8/2005 | Clothier |
| 2005/0184060 | A1 | 8/2005 | Stark |
| 2006/0027555 | A1 | 2/2006 | Aisenbrey |
| 2006/0091133 | A1 | 5/2006 | DiPucchio |
| 2006/0113293 | A1 | 6/2006 | Neger |
| 2006/0118548 | A1 | 6/2006 | Imura |
| 2006/0289486 | A1 | 12/2006 | Cheng |
| 2006/0289487 | A1 | 12/2006 | Tarenga |
| 2007/0000912 | A1 | 1/2007 | Aisenbrey |
| 2007/0000915 | A1 | 1/2007 | Cheng |
| 2007/0131676 | A1 | 6/2007 | Clothier |
| 2007/0142569 | A1 | 6/2007 | Donovan |
| 2007/0158878 | A1 | 7/2007 | Lauridsen |
| 2007/0170175 | A1 | 7/2007 | Avendano |
| 2007/0181563 | A1 | 8/2007 | Hiel et al. |
| 2007/0252694 | A1 | 11/2007 | Collins |
| 2008/0047956 | A1 | 2/2008 | Dudman |
| 2010/0128755 | A1 * | 5/2010 | Luckhardt et al. ............ 374/134 |
| 2010/0129502 | A1 * | 5/2010 | Feinberg et al. .............. 426/231 |

FOREIGN PATENT DOCUMENTS

| | | |
|---|---|---|
| EP | 0829183 | 3/1998 |
| EP | 1260167 | 11/2002 |
| EP | 1671519 | 6/2006 |
| GB | 1399191 | 6/1975 |
| JP | 7241234 | 9/1995 |

* cited by examiner

FOOD WARMING SYSTEM

BACKGROUND OF THE INVENTION

1. Field of the Invention

The invention relates to the field of food preparation and warming, specifically to a warming system that transfers heat to comestible goods and maintains the comestible goods at an increased temperature.

2. Description of the Prior Art

In the food service industry, various means are used for keeping comestible or edible goods at a specific elevated temperature. In particular, if a comparably high volume of comestible goods are to be served, for example in a hospital, warming devices and systems that use devices known as "pellets" are commonly employed for transferring heat to plates on which the comestible goods are arranged. Usually, such pellets have a top surface which is adapted to receive a plate with comestible goods on it. The pellets can be arranged as trays or can be part of trays on which the plates with the comestible goods are arranged.

In order to allow for efficient service procedures, such pellets or corresponding trays have to satisfy several requirements. For example, usually the pellets or trays are previously heated in suitable oven like apparatuses before the comestible goods are placed on the heated pellets or trays afterwards. Therefore, it is highly desirable that the pellets or trays have good heat storage and good head transfer properties that allow for the efficient long term warming of the comestible goods. Additionally, in order to allow for the easy handling and maintenance of the pellets or trays, they should be robust, light weight and safe to use in standard dish washers. For example, in U.S. Pat. No. 5,428,080, a pellet is described that is made from a thermoset polyester resin.

However, while the pellets and trays of the prior art have had their particular successes, they are not without their own specific drawbacks with regard to any of the above mentioned requirements. In particular, the heating of pellets or trays as is taught in the prior art is often a time consuming and laborious process.

Therefore, what is needed is a warming device and system for transferring heat to comestible goods that is safe and efficient to use, particularly with regard to the initial heating of the warming device.

BRIEF SUMMARY OF THE INVENTION

The current invention is directed to a pellet and charging unit for transferring heat to comestible goods, the pellet having a re-heatable body with a top surface adapted to receive the comestible goods. The body includes several gripping portions defined into its top and bottom surfaces, the gripping portions being located at the parallel peripheral edges of the body. The pellet further includes a sheet-type heating element having a conductive filament which is connected to an electric current source provided by the charging unit. The filament is resistively heated by the electric current source thereby producing heat in the heating element which is transferred to the body of the pellet. The body acts as a heat reservoir storing the resistively produced heat to be transferred to the comestible goods. Due to the sheet-type shape and the symmetrical pattern of the heating element, the heat can be efficiently transferred to essentially the whole extent of the body of the pellet which allows for a quick and consistent heating of the body. Also, the heating process of the body is comparably easily and precisely controllable by controlling the charging unit supplying electric current to the filament.

The body of the pellet also includes a plurality of power pins disposed coupled to the filament and a plurality of loop pins disposed in the body adjacent to the power pins. The power pins are also preferably plated with a protective layer. The protective layer is comprised of nickel and tin, in particular approximately 35% nickel and 65% tin. The power pins are easily cleanable and robust enough to be dish washer proof. A pair of guide pins is also disposed next to the power pins and loops pins on both sides. All of the various pins are disposed within a recess that is defined into the body below the top surface of the body, the top surface extending beyond the length of the pins.

After the body has been heated after predefined amount of time within the charging unit, the comestible goods are arranged on the body of the pellet. The body is shaped such that the comestible goods can conveniently be arranged indirectly on its surface through a plate or other means for containing the comestible goods. In particular, the top surface of the body is arranged to be essentially flat with a relief structure defined in its surface for accommodating a suitable plate on which the comestible goods are placed. Having the comestible goods arranged on the heated warming device or pellet indirectly through a plate transfers heat from the body to the comestible goods so that pre-heated comestible goods can be kept at an elevated temperature.

In one particular embodiment, the heatable body is manufactured by any suitable technique and is made of any suitable material such as a polymer, preferably a polymer comprised of thermoset material. Briefly, thermoset material is a thermosetting plastic that irreversibly cures through heat (generally above 200° C.), through a chemical reaction (two-part epoxy, for example), or irradiation such as electron beam processing. Thermoset material can be a fiber reinforced material such as SMC (sheet molding compound), BMC (bulk molding compound, a polyester based glass reinforced thermosetting polymer), polyester or melamine, or preferably a paper material impregnated with phenol- and/or melamine. Phenol is also commonly known as carbolic acid and its chemical formula is generally understood to be $C_6H_5OH$ and its structure is that of a hydroxyl group (—OH) bonded to a phenyl ring. Melamine is an organic base and a trimer of cyanamide with a 1, 3, 5-triazine skeleton. Furthermore, due to the material of the body of the pellet, the pellet can also be comparably easily handled and washed by means of a standard dish washer.

In one embodiment, the filament of the heating element can be made from any suitable conductive material known in the art such as copper, aluminium, extruded fiber or the like. Preferably, the filament is a twisted composite comprising silver fibers and carbon fibers. Such a combination of materials provides for a high-capacity filament allowing for efficient resistive heating. The filament preferably comprises 50% to 70% silver fibers and 50% to 30% carbon fibers, and more preferably 60% silver fibers and 40% carbon fibers. The capacity of the preferred embodiment of the filament in the warming device is capable of heating the body to about 110° C. in about 4 minutes with about 1.4 Amps of electric current.

In one preferred embodiment, the heating element includes a fleece substrate to which the filament is stitched. The fleece substrate allows for efficient and flexible manufacturing of the heating element.

In another preferred embodiment, the heating element is embedded within the body. Using this arrangement the body can be efficiently heated from the inside and a comparably consistent heating of the body is produced.

In another preferred embodiment, the heating element is coupled to a power source through at least one of several sockets coupled to the charging unit. The charging unit also includes several removable shelves which may be used to accommodate pellets with and without attached underliners as detailed below. A controller board is also present within the charging unit which regulates the flow of electric current supplied to the sockets. The controller board also includes means for recording the operational history of each of the sockets and means for downloading that operational history into an external computer.

The sockets within the charging unit include means for mechanically and electrically coupling to the corresponding plurality of pellets via a series power plugs, loop plugs, and guide plugs which are used to accommodate the power pins, loop pins, and guide pins respectively. With such an arrangement between power pins and power plugs, the heating element is connected to the electric current source such that current flows via the power pins through the filament so that the heating element and the body are resistively heated.

In another embodiment, the charging unit includes means for pellet detection. The means for detection is used for recognizing when a pellet is inserted into a predefined position within the charging unit. For example, when being positioned in the charging unit, the specific position that the pellet is placed is recognized by establishing a circuit in the charging unit via the socket and the loop pins disposed on the pellet. The loop pins are comprised of nickel and tin as described above. In one particular embodiment, electric current is only supplied to the power pins after the pellet has been recognized by the charging unit.

In another embodiment, each of the sockets comprise a male component which is inserted into a tapered notch defined within the body of a pellet as the pellet itself is being inserted into the charging unit.

In a further embodiment, the charging unit includes several pellet status lights, each status light being located adjacent to the position within the charging unit in which the inserted pellet is being heated. The pellet status lights are regulated by the controller board and are used for indicating to a user whether or not the pellet has completed the heating process through the charging unit.

In yet another preferred embodiment, the pellet includes a guide member being coupled to the body. For example, the guide member can be arranged as a rail on a side surface or on a bottom surface of the pellet. The guide member allows for an exact insertion of the pellet into the charging unit. The heating element preferably extends radially throughout the whole top surface of the body of the pellet, thereby efficiently heating the entire top surface of the body.

To facilitate easy handling, in one embodiment the body of the pellet preferably includes a gripping portion. One or more gripping portions can be arranged as recesses into the body which substantially accommodate the hands of a user.

In another embodiment, the pellet includes an underliner being attachable to the body of the pellet such that the underliner projects above the top surface of the body when attached. The underliner acts as a border and prevents the comestible goods and the plate that the comestible goods are disposed on from falling off of the pellet. The body includes several male components disposed symmetrically around the circumference of the body and include means for coupling to corresponding amount of female apertures that are defined within the underliner. In one particular embodiment, the underliner and the body are coupled via the engagement of a full or partial thread such as a bayonet joint.

Furthermore, the pellet includes a cover or dome being configurable with the pellet. With the dome, the comestible goods can be easily protected when disposed on the body while cooling thereof can be prevented at the same time.

In another preferred embodiment, the body includes means for placing it on its bottom surface, such placing means including a plurality of knobs or parallel rails. The placing means minimize the transfer of heat from the bottom surface of the body to a surface onto which the pellet has been placed.

The invention also provides for a method for heating a pellet used for maintaining comestible goods at an elevated temperature including inserting at least one pellet into a charging unit, coupling the pellet to at least one socket disposed within the charging unit, detecting the presence of the pellet at a specific location within the charging unit, and supplying a flow of electric current to the at least one pellet through the socket. The flow of electric current heats the pellet at which point the flow is discontinued to the pellet through the socket and the pellet is removed from the charging unit.

When the pellet is inserted into the charging unit, a parallel pair of rails disposed on a bottom surface of the pellet is inserted into a corresponding parallel pair of troughs defined in a horizontal shelf disposed within the charging unit and the pellet is then slid distally across the shelf towards a back portion of the charging unit.

Alternatively, the pellet is inserted into the charging unit by first inverting the pellet and exposing its bottom surface. The pellet is then inserted between a parallel pair of ridges disposed on a horizontal shelf disposed within the charging unit and slid distally across the shelf towards a back portion of the charging unit.

In one embodiment, the coupling of the pellet to a socket disposed within the charging unit includes inserting a pair of power pins disposed on the pellet into a corresponding pair of power plugs defined within the socket. A pair of loop pins adjacently disposed on the pellet next to the power pins are then inserted into a corresponding pair of loop plugs defined within the socket along with a pair of guide pins into a corresponding pair of guide plugs.

The presence of the pellet at a specific location within the charging unit includes completing a circuit with a detection shunt disposed within the socket by insertion of the loop pins into the loop plugs as described above and then sending a signal to a controller board within the charging unit that the pellet has been successfully coupled at a specific socket location within the charging unit.

In one preferred embodiment, heating of the pellet includes conducting the flow of electric current from the power pins to a filament disposed within a body of the at least one pellet and resistively heating the filament by means of the electric current. The hot filament then thermally transfers the heat generated to a top surface of the pellet.

In another embodiment, the discontinuation of the flow of electric current to the pellet through the socket includes breaking the completed circuit with the detection shunt disposed within the socket thereby stopping the flow of electric current to the power plugs defined within the socket. Alternatively, the flow of electric current to the power plugs is stopped after a predetermined amount of time has elapsed as determined by the controller board.

In still another embodiment, the method further includes cycling the flow of electric current supplied to the pellet on and off for predetermined amounts of time as determined by a controller board coupled to the socket.

Finally, the method further includes powering down the charging unit after a predetermined amount of time of inactivity has elapsed as determined by a controller board coupled to the socket.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
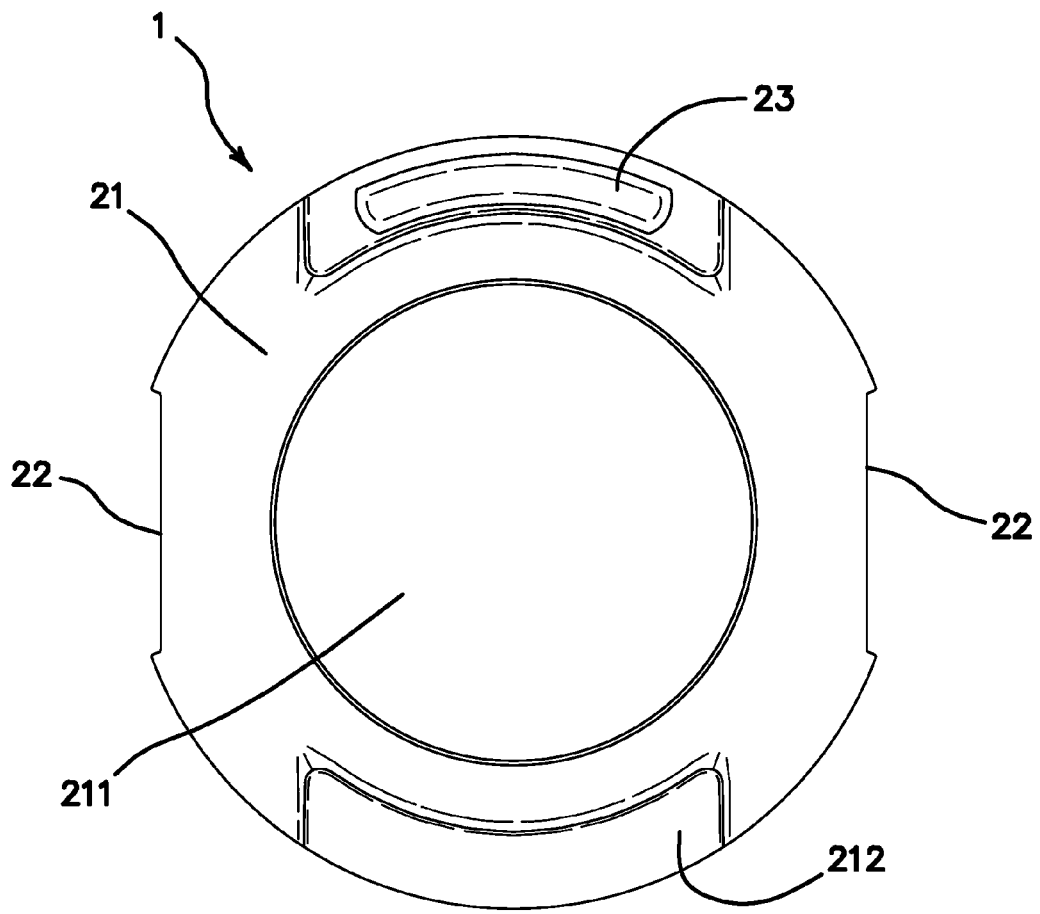
FIG. 1 is a top down plan view of the top surface of the small pellet embodiment according to the present invention.
Figure 6:
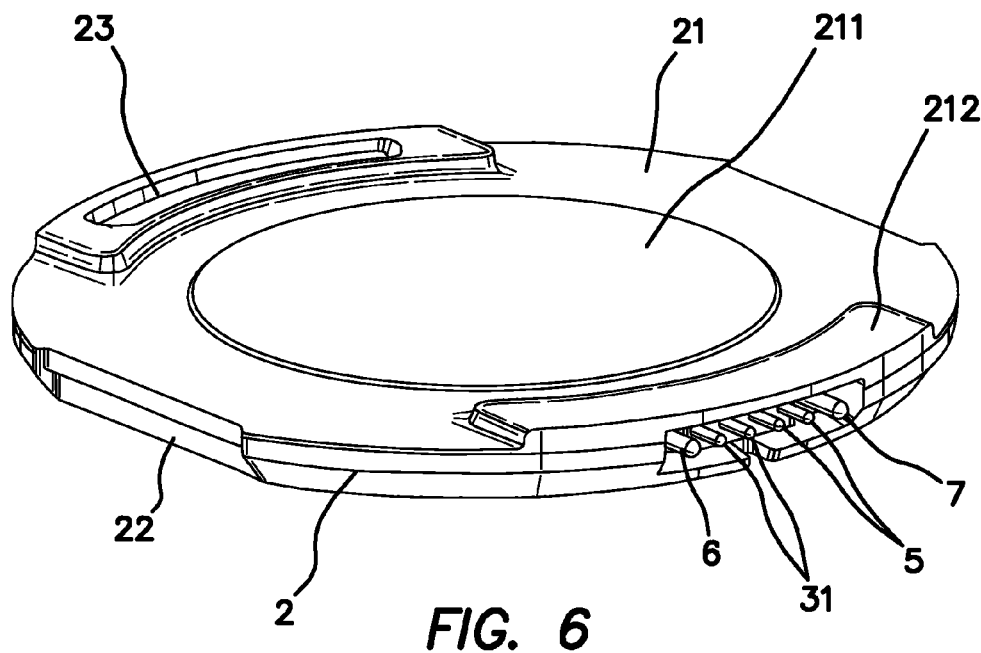
FIG. 6 is a perspective view of the top surface of the small pellet seen in FIG. 1.

A first embodiment of the current invention can be seen in FIGS. 1 and 6 and will be referenced herein after for ease of descriptive purposes as the "small pellet". FIG. 1 is a top down view of a top surface 21 of a body 2 of a small pellet generally noted by reference numeral 1. The body 2 is substantially disk shaped, specifically it is substantially circular with a predetermined thickness as seen in the perspective view of FIG. 6 and is preferably comprised of a polymer such as sheet molding compound, polyester based glass reinforced polymers, polyester, melamine, or a paper material impregnated with phenol and/or melamine. However it is to be expressly understood that other thermoset materials known in the art for their heat retention characteristics may also be well within the use of one ordinarily skilled in the art. The top surface 21 of the body 2 comprises a relief central portion 211 sized and shaped to accommodate a plate 190 seen in FIG. 42 with comestible goods or food to be disposed thereon. The body 2 comprises two gripping portions 22 defined into its left and right sides, the gripping portions 22 being defined parallel to each other on either side of the small pellet 1 as seen in FIG. 1. The top surface 21 also comprises an elevated recess cover 212 and an insertion handling section 23 as best seen in FIG. 6. The exact placement of the gripping portions 22, recess cover 212, and insertion handling section 23 about the body 2 of the small pellet 1 shown in FIGS. 1 and 6 is meant to be for illustrative purposes only. Fewer or additional gripping portions 22 along other segments of the body 2 other than what is shown may be possible without departing from the original spirit and scope of the invention.

Figure 2:
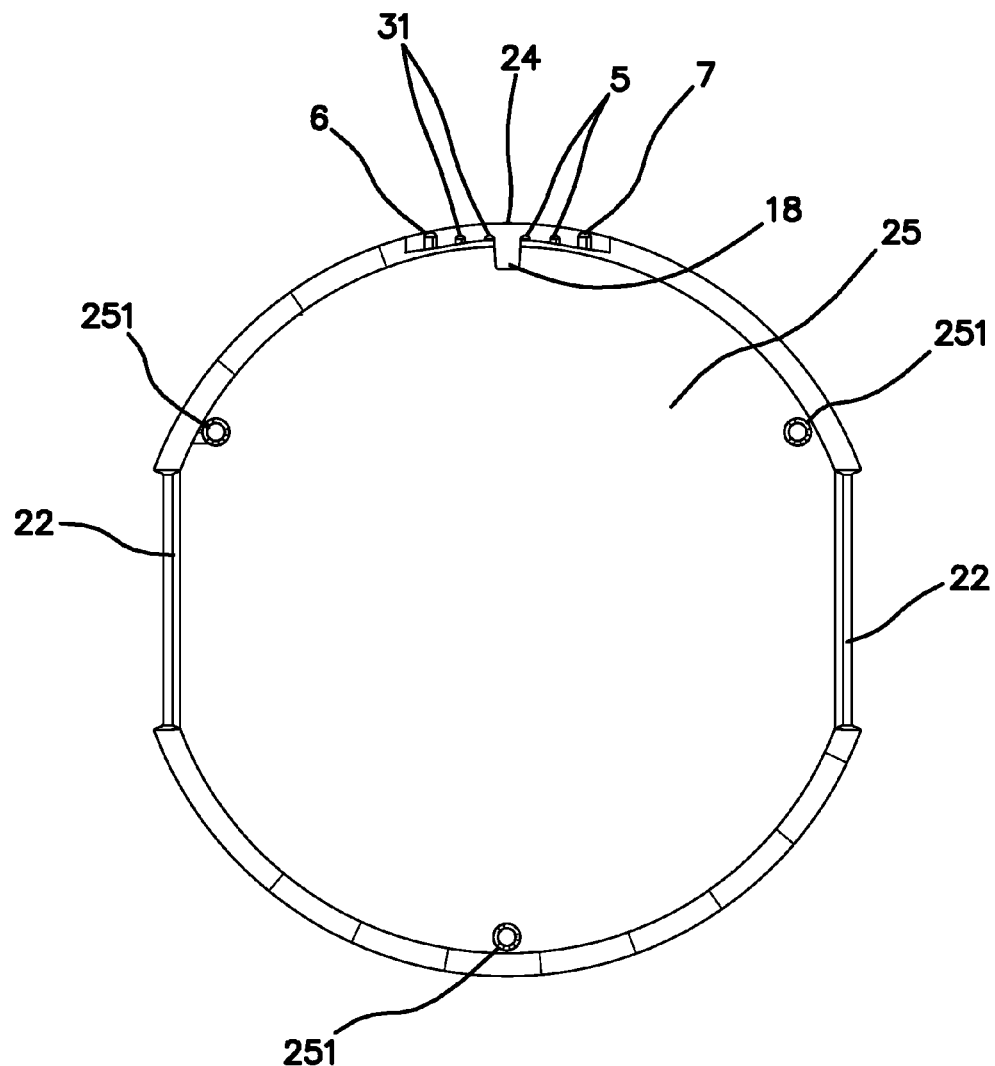
FIG. 2 is a plan view of the bottom surface of the small pellet seen in FIG. 1.
Figure 5:
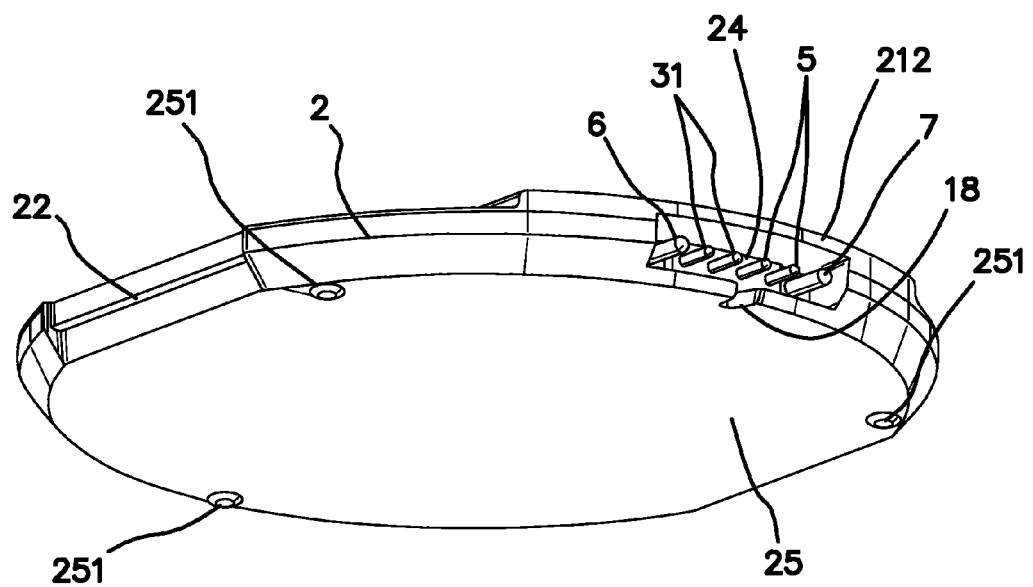
FIG. 5 is a perspective view of the bottom surface of the small pellet seen in FIG. 1.

In FIGS. 2 and 5, a bottom surface 25 of the body 2 is shown. The bottom surface 25 comprises at least three knobs 251 disposed at the approximate vertices of a triangular pattern. A recess 24 is defined into the body 2 which is covered by the recess cover 212 of the top surface 21 seen in FIG. 1. Adjacent to the recess 24 and defined into the bottom surface 25 is a notch 18. The notch 18 is substantially rectangular shaped and tapers to a narrower width the further it is defined within the bottom surface 25. Inside the recess 24, a plurality of pins 5, 6, 7, 31 are disposed. The outer most pins disposed at either extreme of the recess 24 are a pair of guide pins 6, 7, specifically a "left" guide phi 6, and a "right" guide pin 7 as seen in FIG. 2. Disposed next to the left guide pin 6 is a pair of power pins 31 which are electrically connectable at their proximate ends to a current or power source which provides current to the small pellet 1 as will be further detailed below.

Figure 7:
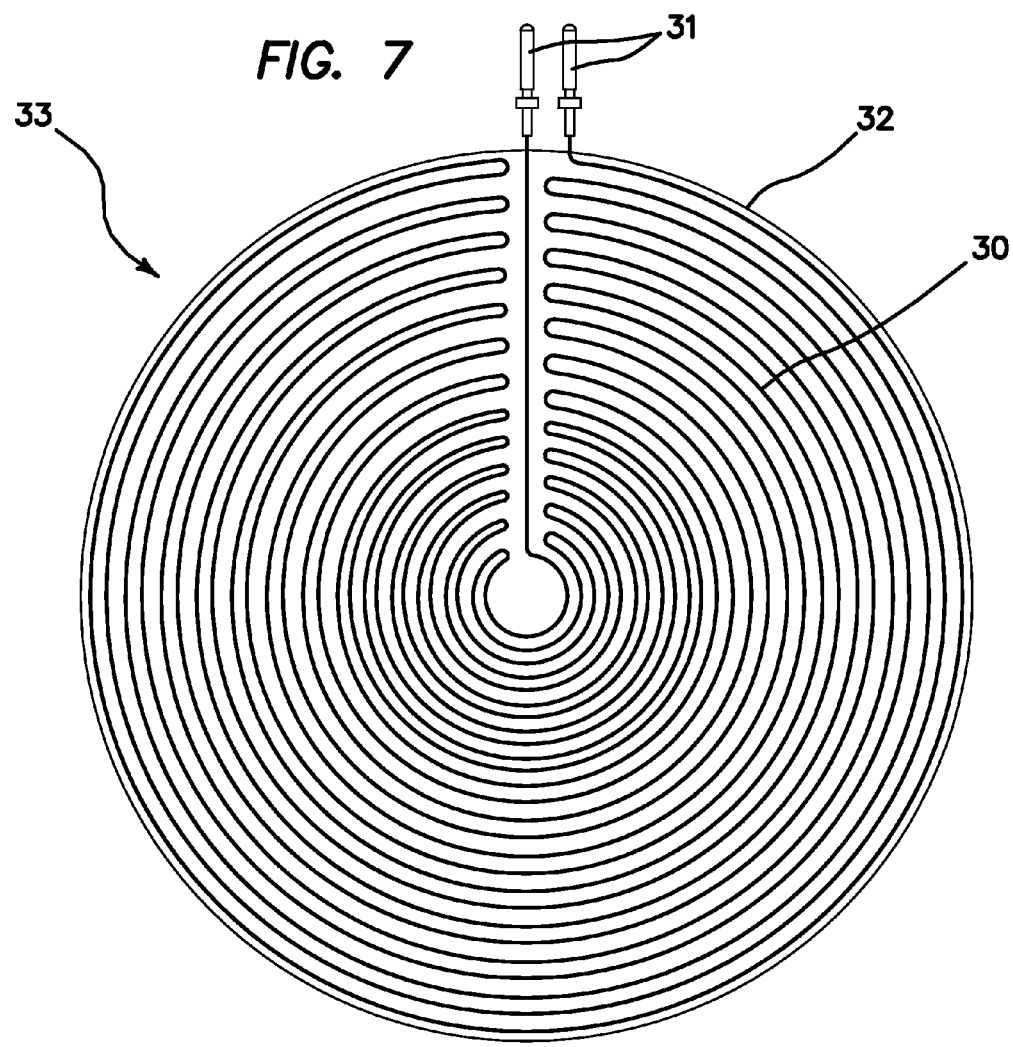
FIG. 7 is a top down plan view of the heating element that is disposed within the small and large pellets of FIGS. 1 and 4 respectively.
Figure 8:
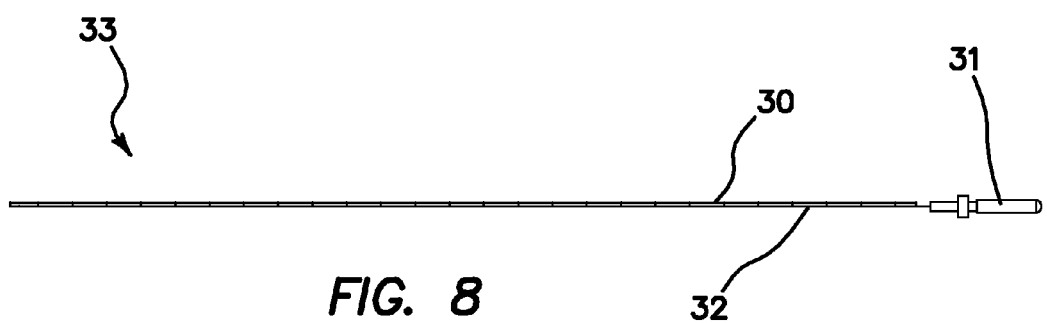
FIG. 8 is a side view of the heating element seen in FIG. 7.
Figure 9:
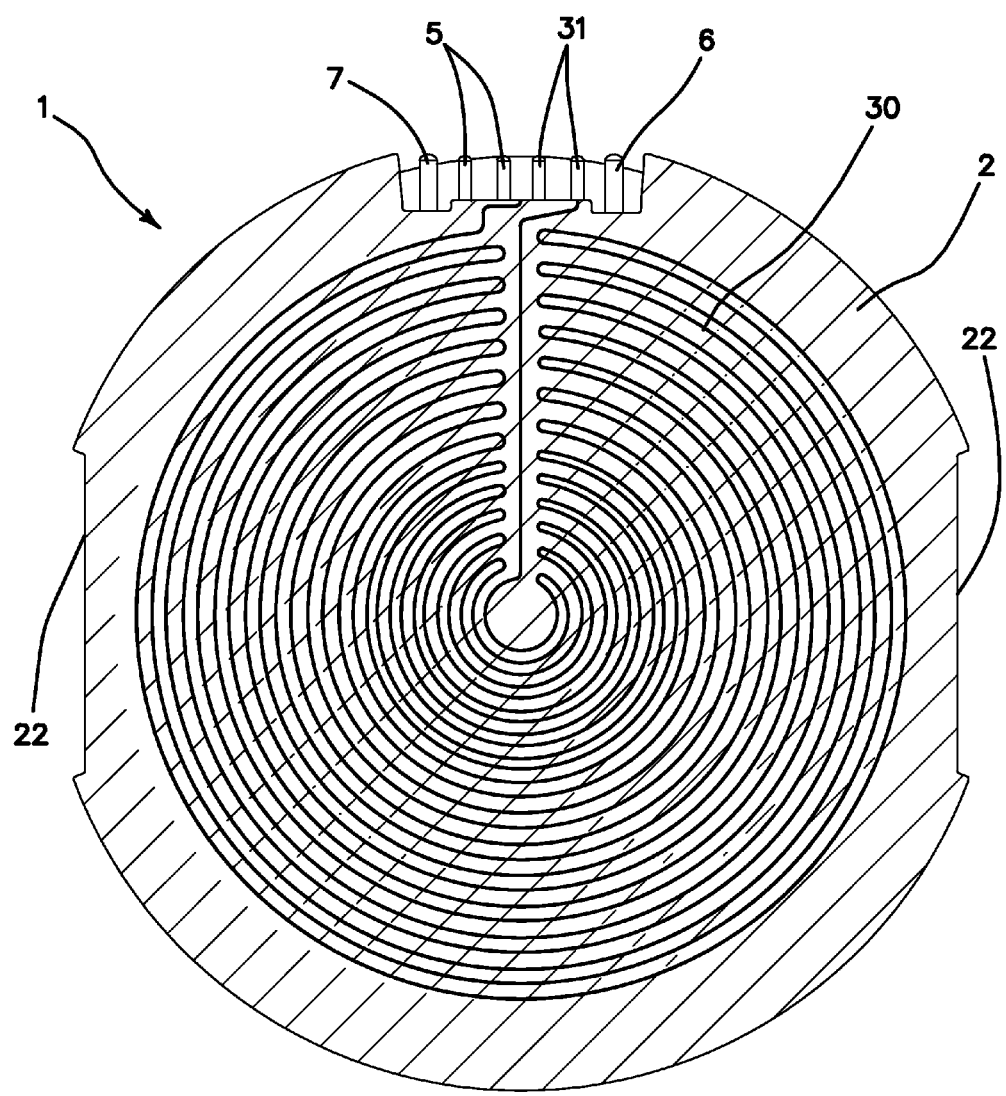
FIG. 9 is a top down cross-sectional view of the small pellet seen in FIG. 1 with the internal heating element visible.

The two power pins 31 are also electrically coupled to a filament 30 shown in FIG. 7. The filament 30 is disposed on the top surface of a substrate 32 comprised of lightweight fabric material such as polyester. The filament 30 itself preferably comprises 50% to 70% silver fibers and 50% to 30% carbon fiber and more preferably 60% silver fibers and 40% carbon fibers. However it is to be expressly understood that other resistive heating materials comprised of conductive metals or metal alloys such as gold, copper, or aluminium combined with other insulators such as silicon, glass, or plastic polymers at varying percentages may be used without departing from the claimed embodiments. The filament 30 and substrate 32 thus combine to form a heating element 33 seen in FIGS. 7 and 8. The filament 30 is disposed on the substrate 32 in a semi-circular pattern throughout the entire radius of the substrate 32. The heating element 33 is substantially sheet-like, namely it is substantially flat with a thin cross-sectional area as seen in FIG. 8. The heating element 33 when coupled to the power pins 31 is disposed within the body 2 of the small pellet 1 as seen in the top down cross-sectional view of FIG. 9. The heating element 33 is in thermal contact with the top surface 21 so that when electric current is travelling through the filament 30 as provided from the power pins 31, resistive heat is created which in turn heats the adjacent top surface 21.

Returning to FIGS. 5 and 6, adjacent to the power pins 31 and the right guide pin 7 are a pair of loop pins 5. The loop pins 5 are used for recognizing if the small pellet 1 is arranged inside of a charging unit 100 as will be detailed below. The power pins 31 and the loop pins 5 are of identical shape and dimension whereas the guide pins 6, 7 have a larger diameter and project further out of the small pellet 1 than the power pins 31 and the loop pins 5. Also as can be seen in FIG. 5, each gripping portion 22 of the body 2 forms a "step" so that the body 2 may be held in a relatively safe manner by the hands of a user when the small pellet 1 is hot.

Figure 3:
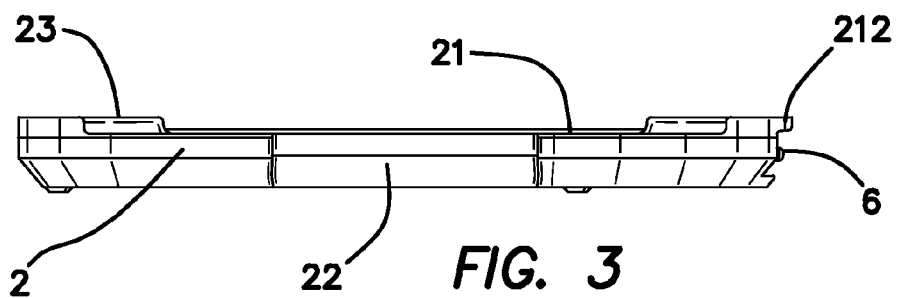
FIG. 3 is a left side plan view of the small pellet seen in FIG. 1.

FIG. 3 is a side view of the left side small pellet 1 seen in FIG. 1. As can be seen in FIG. 3, the recess cover 212 of the top surface 21 of the body 2 projects outward from the body 2 and completely covers the guide pins 6, 7 as well as the power pins 31 and the loop pins 5 from above. As can be seen in FIGS. 3 and 5, the recess cover 212 of the top surface 21 of the body 2 projects above a section of the top surface 21 onto which the comestible goods are to be placed. Since all of the pins 5, 6, 7, 31 are arranged inside the recess 24 beneath the recess cover 212, the pins 5, 6, 7, 31 are protected but yet still accessible for being connected to other components of the warming system. As can also be seen in FIGS. 3 and 6, the insertion handling section 23 is an indentation defined into the top surface 21 of the body 2 which allows the small pellet 1 to be held by a user while being inserted into a charger as discussed in further detail below.

Figure 4:
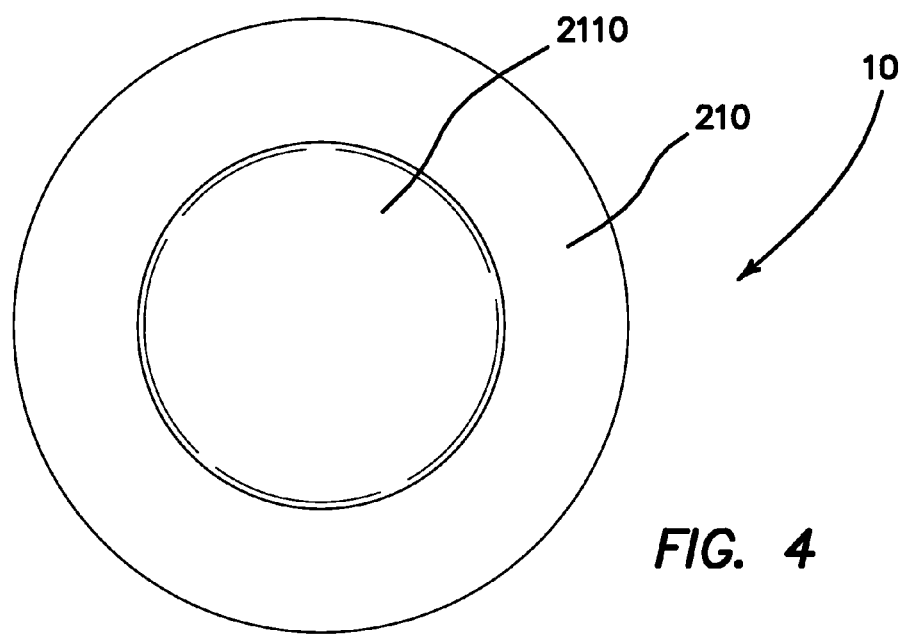
FIG. 4 is a top down plan view of the top surface of the large pellet embodiment according to the present invention.
Figure 10:
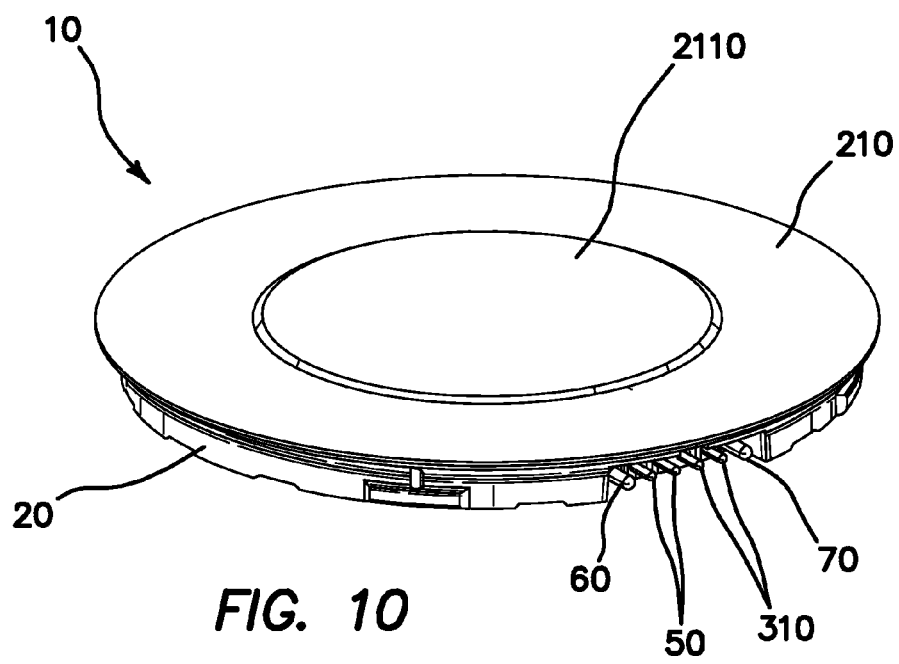
FIG. 10 is a perspective view of the top surface of the large pellet seen in FIG. 4.

Turning to FIGS. 4 and 10-14, a second embodiment of the current invention referenced herein after for ease of descriptive purposes as the "large pellet" is generally denoted by reference numeral 10 is shown. The large pellet 10 comprises a body 20 with a top surface 210 as seen in FIGS. 4 and 10. The body 20 is substantially in the shape of a disk, specifically it is substantially circular with a predetermined thickness as seen in the perspective view of FIG. 10 and is preferably comprised of a polymer of thermoset material known in the art for its heat retention characteristics. The top surface 210 comprises a relief central portion 2110 for accommodating a plate 190 with comestible goods or food disposed thereon.

Figure 11:
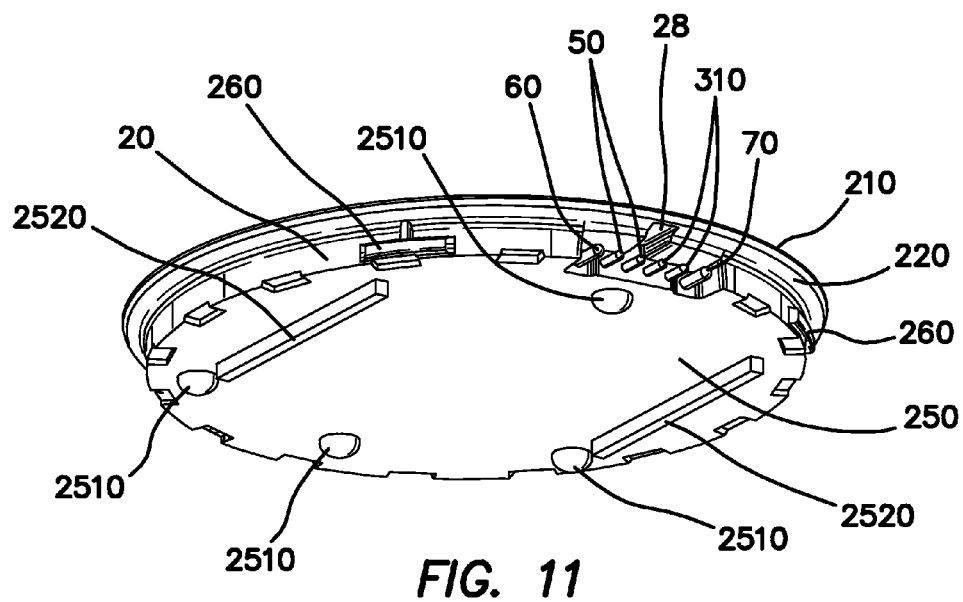
FIG. 11 is a perspective view of the bottom surface of the large pellet seen in FIG. 4.
Figure 12:
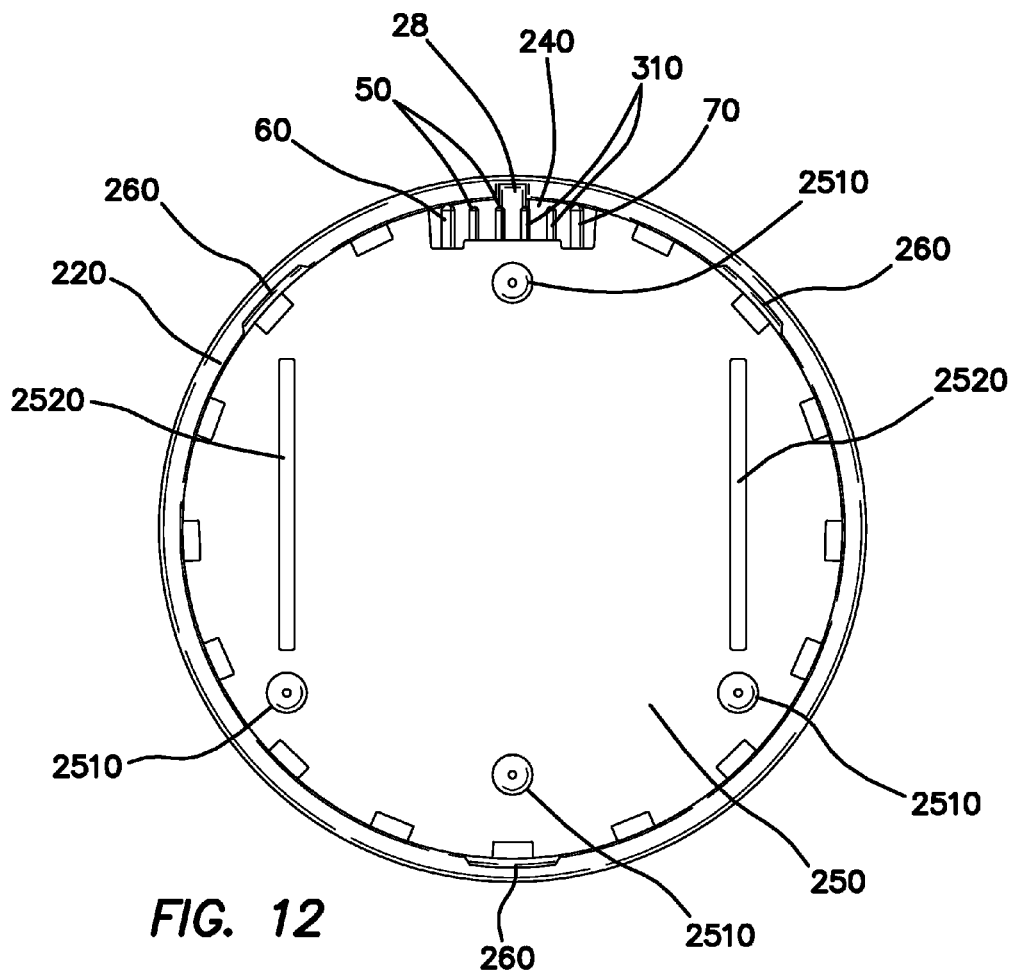
FIG. 12 is a plan view of the bottom surface of the large pellet seen in FIG. 4.

In FIGS. 11 and 12 the bottom surface 250 of the body 20 is shown. The top surface 210 overlaps the outside periphery of the bottom surface 250 such that a step 220 is formed which may be used as a gripping portion or handle for a user. The bottom surface 250 itself comprises at least four knobs 2510 and at least two parallel rails 2520 that act as "guide members". It is to be expressly understood however that fewer or additional knobs 2510 or rails 2520 other than what is shown may be disposed on the bottom surface 250 without departing from the original spirit and scope of the invention.

As seen in FIGS. 11 and 12, a recess 240 is defined within the bottom surface 250 which is covered from above by the top surface 210. Adjacent to the recess 240 and defined into the step 220 is a notch 28. The notch 28 is substantially rectangular shaped and tapers to a narrower width the further it is defined within the step 220. Inside the recess 240 are a plurality of parallel pins which are arranged to extend outwardly from the substantially disk shaped body 20. The outer most pins disposed at either extreme of the recess 240 are a pair of guide pins 60, 70, specifically a "left" guide pin 60, and a "right" guide pin 70 as seen in FIG. 12. Disposed next to the right guide pin 70 is a pair of power pins 310 which are electrically connectable at their proximate ends to a current or power source which provides current to the large pellet 10 as will be further detailed below. The power pins 310 comprise means for electrically connecting to a filament 30 substantially similar to that shown in FIG. 7. Like with the previous embodiment disclosed above, the filament 30 and accompanying substrate 32 form a heating element 33 which is disposed internally within the body 20 of the large pellet 10. The heating element 33 provides a resistive heating means for the large pellet 10 which maintains any comestible goods disposed thereon at an elevated temperature.

Adjacent on to the power pins 310 and the left guide pin 60 are a pair of loop pins 50. The loop pins 50 comprise means for recognizing if the large pellet 10 is arranged inside of a charging unit 100 as will be detailed below. The power pins 310 and the loop pins 50 are of identical shape and dimension whereas the guide pins 60, 70 have a larger diameter and project further out of the large pellet 10 than the power pins 310 and the loop pins 50.

Figure 13:
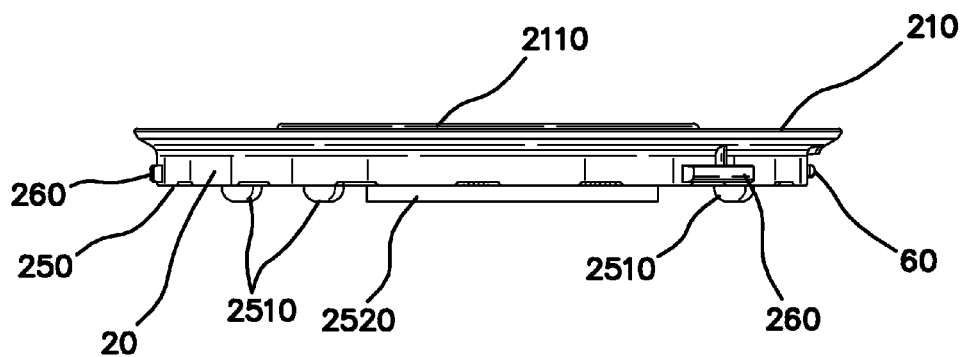
FIG. 13 is a left side plan view of the large pellet seen in FIG. 4.

Radially extending from the bottom surface 250 are at least three male components 260 of a bayonet joint are which are arranged symmetrically about the circumference of the bottom surface 250 of the body 20 as best seen in FIGS. 11-13.

Figure 14:
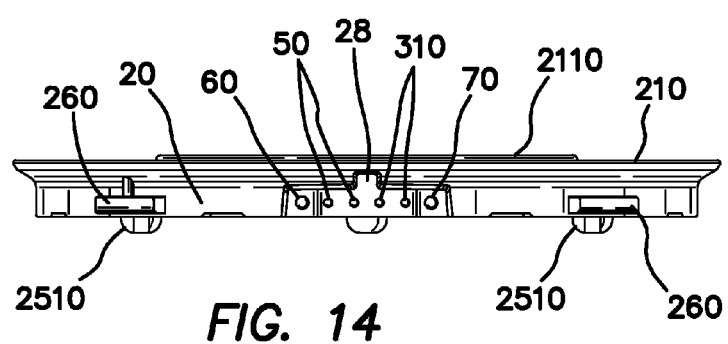
FIG. 14 is a rear plan view of the large pellet seen in FIG. 4.

Turning to FIG. 13, the relief central portion 2110 of the top surface 210 is projects slightly above the rest of the top surface 210. The rails 2520 extend beyond the bottom surface 250 to the same extent as the knobs 2520 such that in addition to acting as guiding members, the rails 2520 also maintain the warm body 20 of the large pellet 10 a sufficient distance away from an adjacent surface such as a table or counter top. FIG. 14 shows a rear view of the large pellet 10 including the power pins 310, the loop pins 50 and the guide pins 60 arranged thereon. As can be particularly seen in FIG. 14, the male components 260 are substantially shaped like a horizontal rectangular bar.

Figure 15:
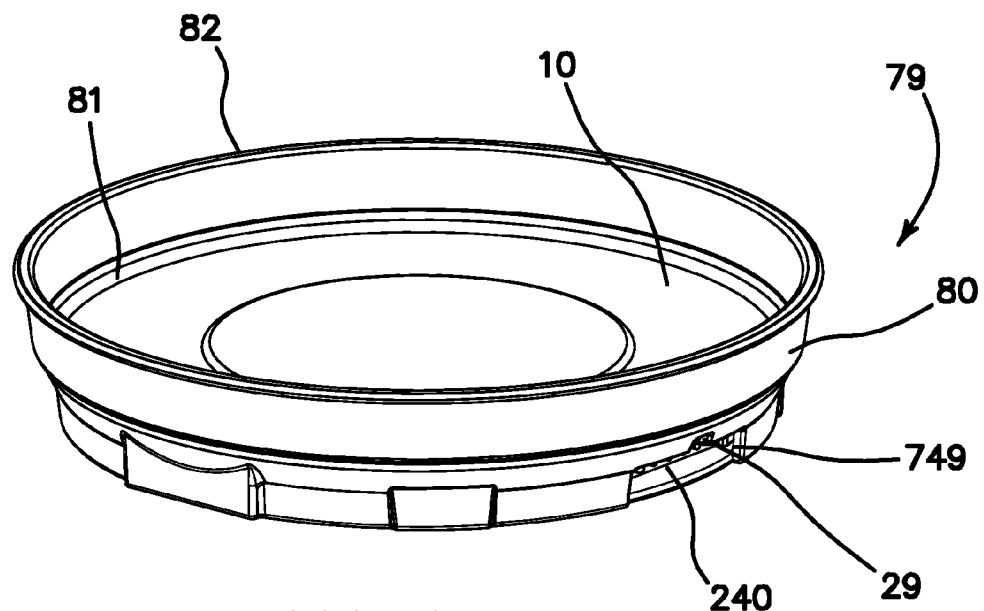
FIG. 15 is a perspective view of an alternative embodiment of the large pellet coupled to an underliner component.
Figure 16:
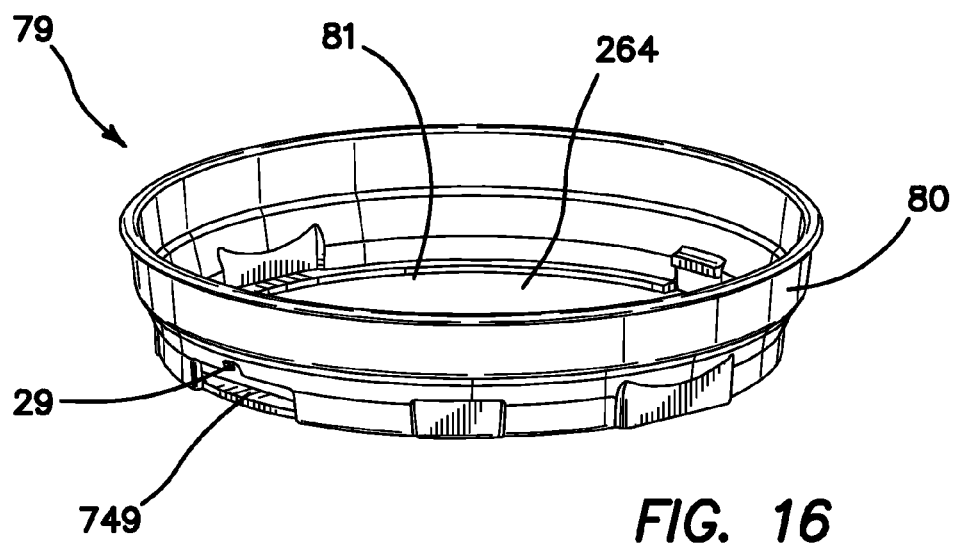
FIG. 16 is a perspective view of the underliner seen in FIG. 15 when not coupled to the large pellet.
Figure 17:
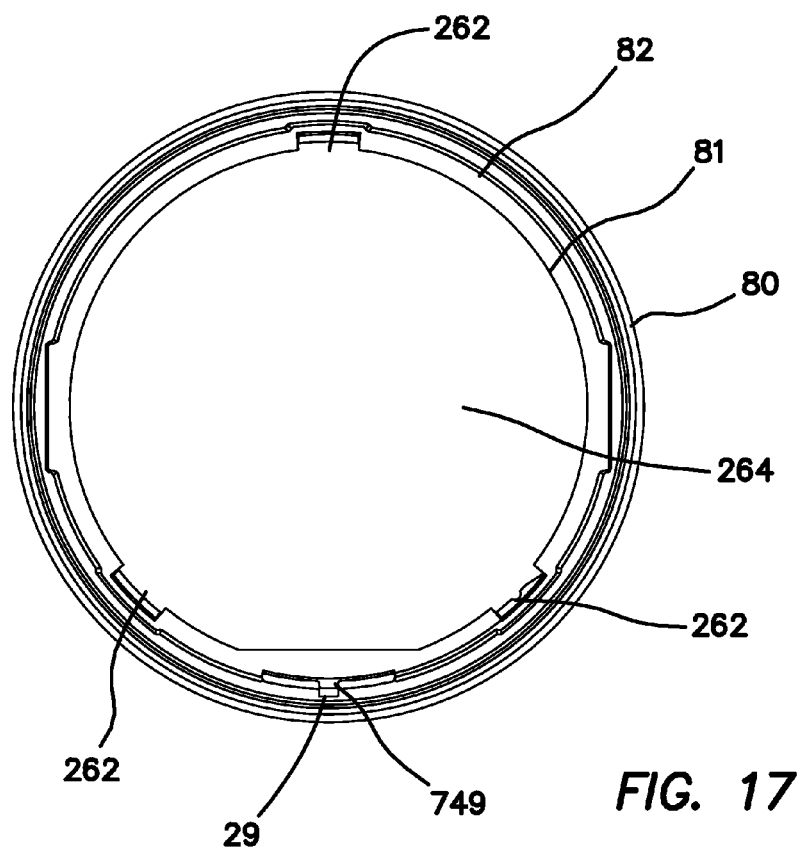
FIG. 17 is plan view of the bottom of the underliner seen in FIG. 16.

FIGS. 15-20 show an optional embodiment for the large pellet 10 comprising an underliner generally denoted with reference numeral 79. The underliner 79 is similar in shape to that of the large pellet 10, namely it is substantially circular in shape and is large enough to be disposed around the circumference of the large pellet 10 as best seen in the perspective view of FIG. 15. The underliner 79 as seen in FIGS. 16 and 17 comprises a border 80 with an inner radius 81 and an outer radius 82 and an access port 749 defined into an arc segment of its outer radius 82. The border 80 also comprises a notch aperture 29 defined its surface just above the access port 749 as best seen in FIGS. 15 and 16. The inner radius 81 comprises at least three female apertures 262 defined symmetrically about the underliner 79, each female aperture 262 corresponding to a male component 260 disposed on the body 20 of the large pellet 10. As can also be best seen in FIG. 17, the underliner 79 in addition to being substantially circular shaped, also comprises a circular bottom aperture 264. The underliner 79 is preferably comprised of nylon resin, however other types of plastic or plastic composites now known or later devised may be used without departing from the original spirit and scope of the invention.

Figure 18:
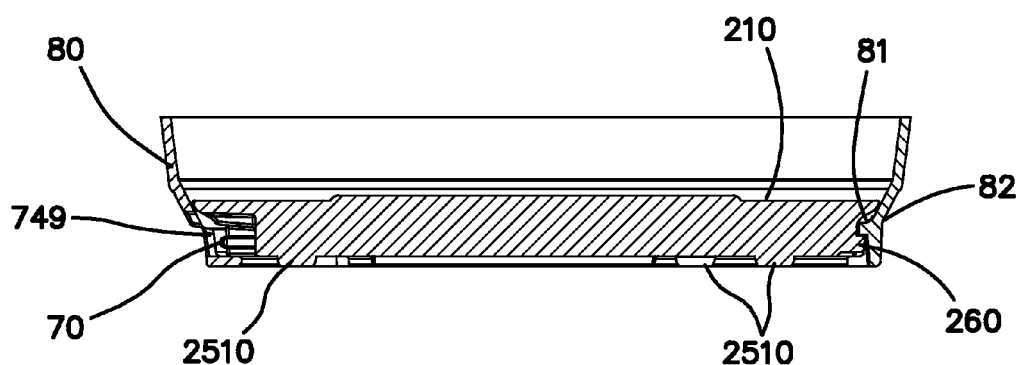
FIG. 18 is a cross-sectional side view of the large pellet and underliner seen in FIG. 15.
Figure 19:
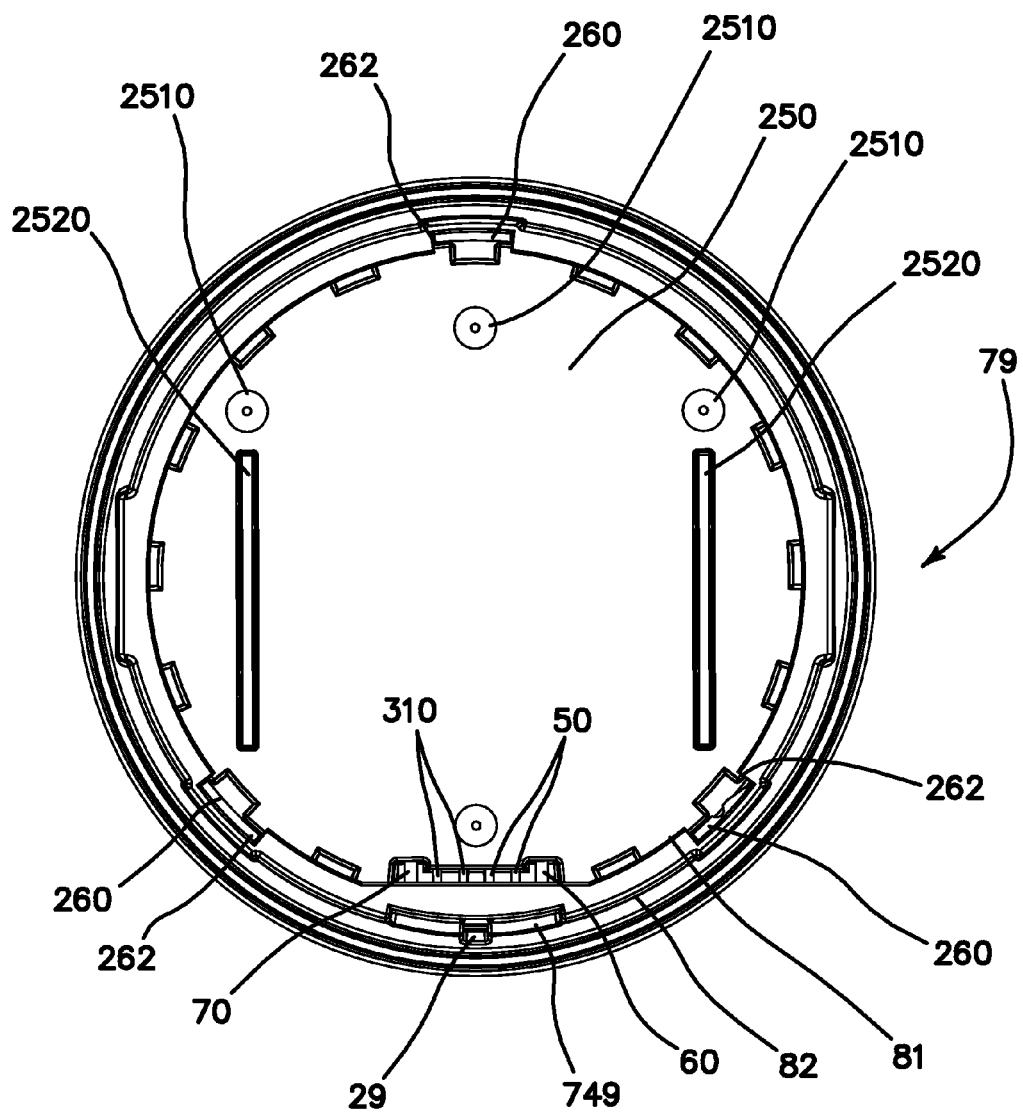
FIG. 19 is a bottom plan view of the large pellet and underliner seen in FIG. 15.
Figure 20:
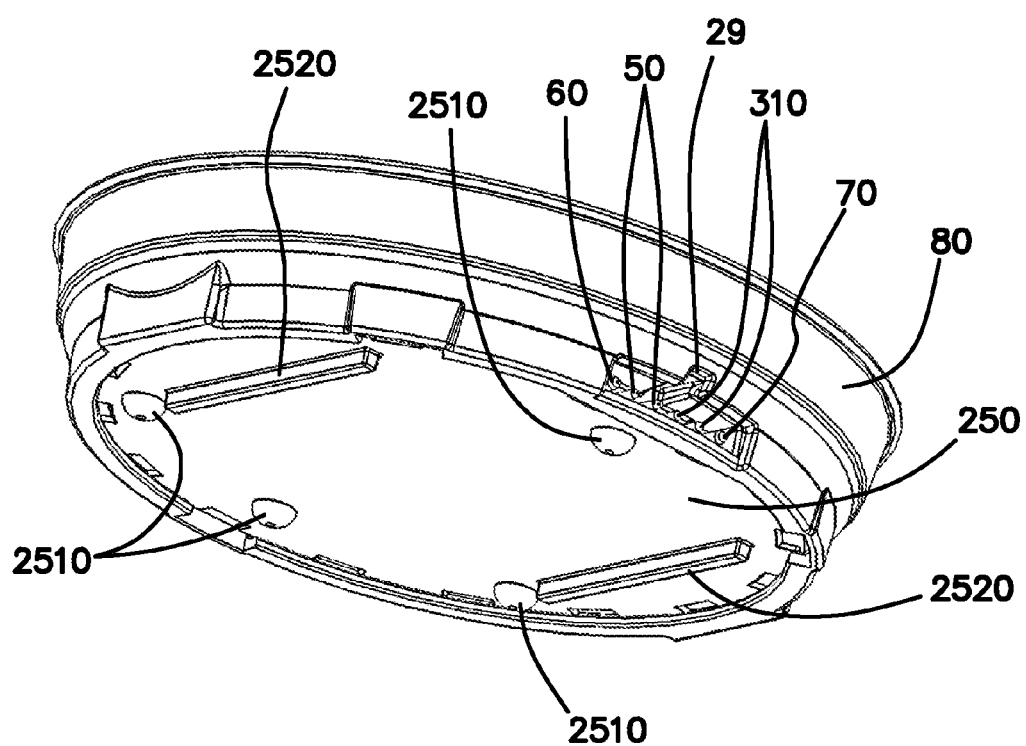
FIG. 20 is perspective rear view of the large pellet and underliner seen in FIG. 15.

The large pellet 10 is coupled to the underliner 79 by first disposing the large pellet 10 into the middle of the underliner 79 in the bottom aperture 264 so that the male components 260 are inserted into the female apertures 262 of the body 20 of the large pellet 10 and so that the body 20 rests on top of the inner radius 81 as seen in FIG. 18. The large pellet 10 is then snapped into the underliner 79 by pressing in on the male components 260 until each of the male components 260 are become enveloped by the female apertures 262 as best seen in FIG. 19. When the male components 260 are fully inserted into the female apertures 262, the large pellet 10 is effectively "locked" into the underliner 79 such that the large pellet 10 moves with the underliner 79 as a single unit and does not separate from the underliner 79. It should be expressly understood that other equivalent means for coupling the large pellet 10 to the underliner 79 such as bayonet joints, tabs, or the engagement of a full or partial thread may also be used without departing from the spirit and scope of the invention. When the large pellet 10 is locked into the underliner 79, the knobs 2510 extend beneath the bottom aperture 264 as seen in FIG. 18 such that the knobs 2510 are still capable of maintaining the warm large pellet 10 above a table or counter top surface it is disposed upon. Also, by snapping in and locking the large pellet 10 into the underliner 29, the aperture 29 defined within the border 80 of the underliner 79 becomes aligned with that of the notch 28 defined in the large pellet 10. The alignment of the aperture 29 with the notch 28 in effect extends the notch 28 of the large pellet 10 to the outside surface of the underliner 79. In order to decouple the large pellet 10 from the underliner 79, the male components 260 of the large pellet 10 are pushed out from the opposing direction in which they were inserted so that the male components 260 are released from the female apertures 262. The large pellet 10 is then lifted out of the underliner 79 unhindered.

In order to ensure that the power pins 310 and loop pins 50 of the large pellet 10 are still accessible when the underliner 79 is coupled to it, the access port 749 is defined within the border 80 of the underliner 79 such that when the large pellet 10 is coupled to the underliner 79 as described above, the recess 240 of the large pellet 10 becomes aligned with that of the access port 749 as seen in FIGS. 15 and 18-20. With the recess 240 comprising the plurality of power pins 310 and loop pins 50 left exposed by the underliner 79, the large pellet 10 may still be freely coupled to a charging unit or other source of power as will be described in further detail below without having to remove the underliner 79 beforehand.

Figure 21:
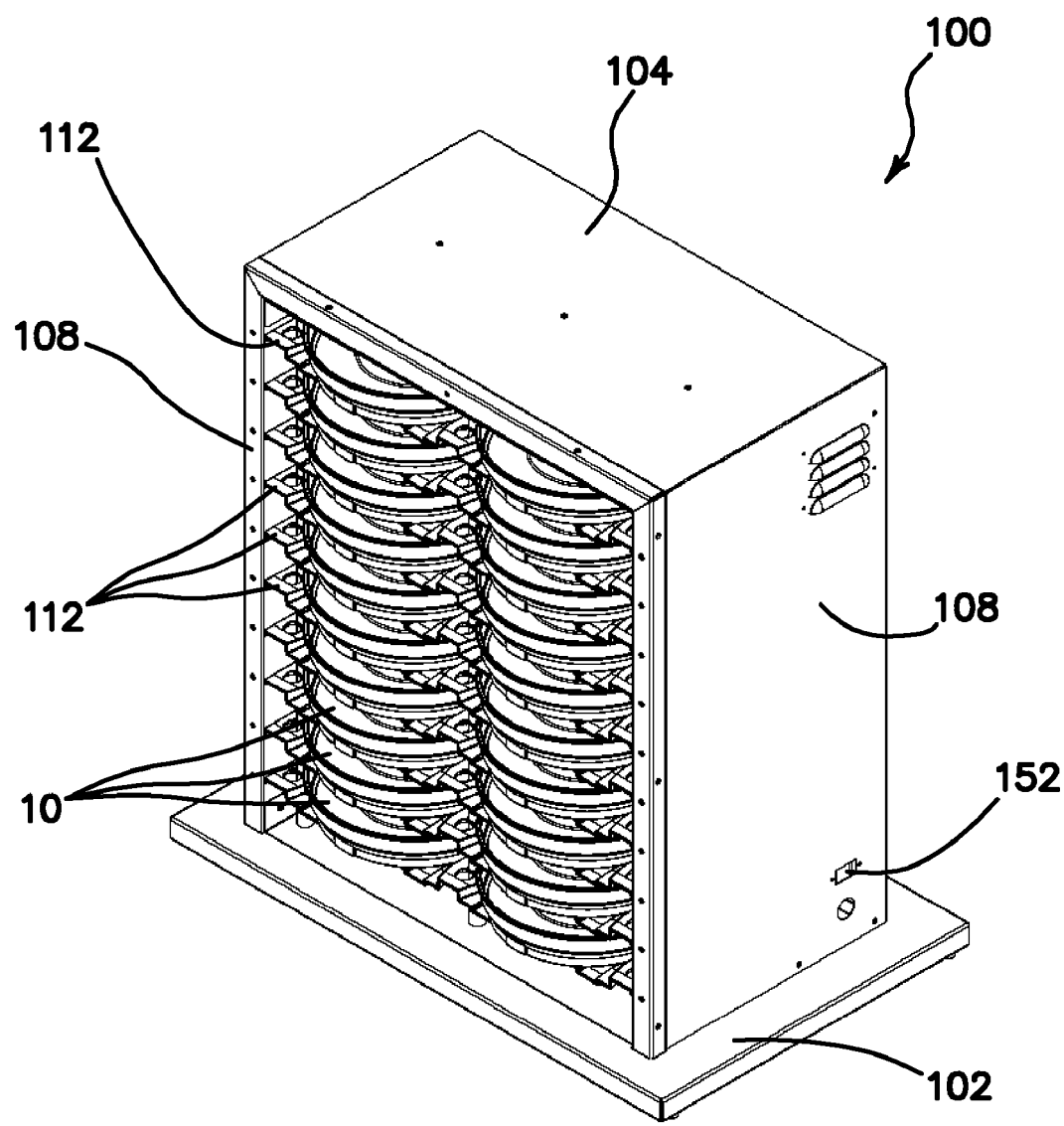
FIG. 21 is a perspective view of a charging unit embodiment according to the present invention with a plurality of large pellets and underliners inserted into it.
Figure 22:
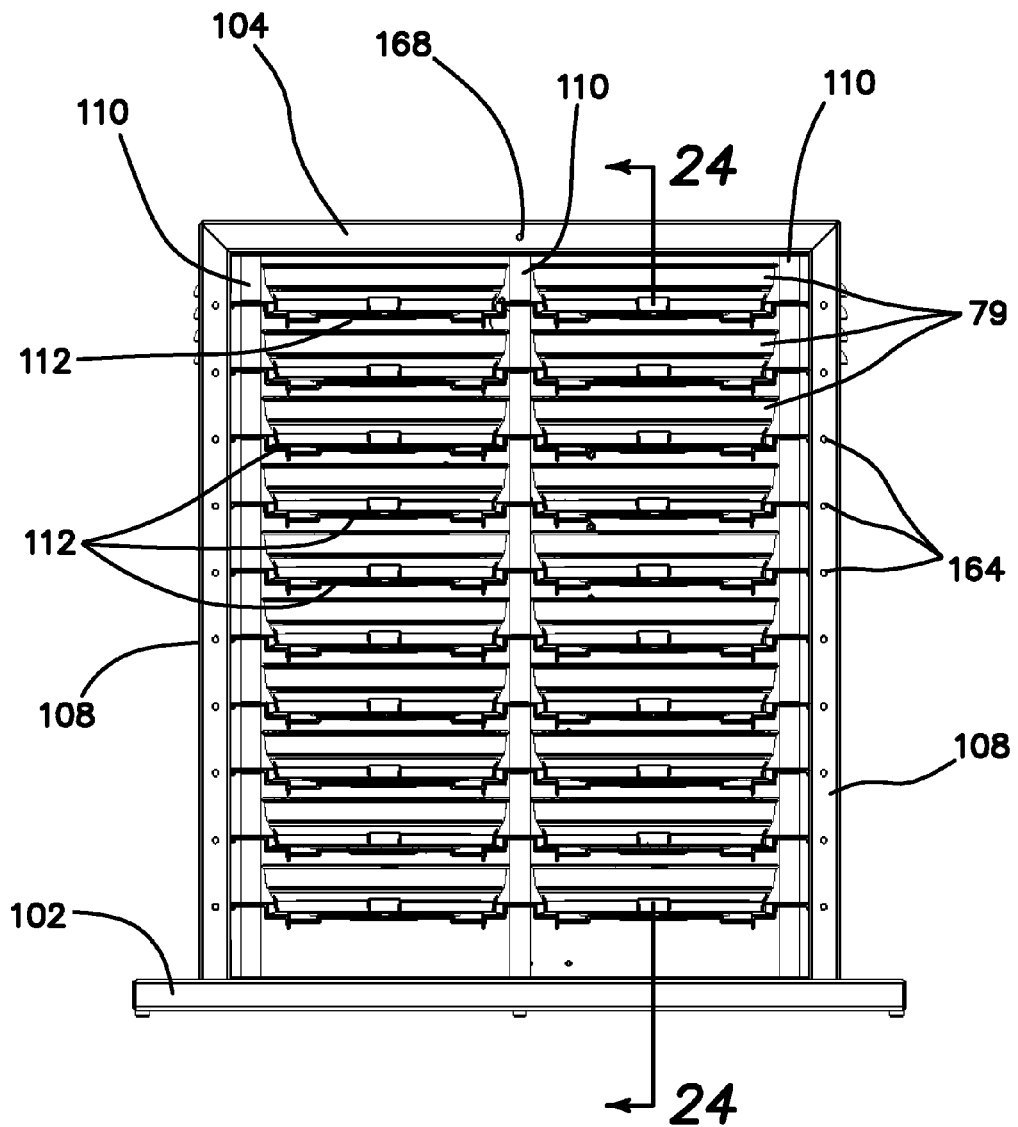
FIG. 22 is a frontal plan view of the charging unit seen in FIG. 21.

The small pellets 1 and the large pellets 10 with coupled underliners 79 receive power through a charging unit 100 as best seen in FIGS. 21 and 22. The charging unit 100 comprises a base 102, a top surface 104, a back portion 106, and two side walls 108 configured in a substantially rectangular shape with an open face that allows the user to insert or remove a plurality of small or large pellets 1, 10. The charging unit 100 is comprised of stainless steel, however other metals metal alloys, plastic, or plastic composites may be used without departing from the original spirit and scope of the invention.

The charging unit 100 also comprises a plurality of vertical support rods 110 within the interior of the unit 100 as best seen in FIG. 22. The rods 110 support a plurality of shelves 112 which in turn support two small pellets 1 or two large pellets 10 and underliners 79 each. Each shelf 112 extends across the full length between the side walls 108 and is coupled to the rods 110 in at least three positions, preferably at the extreme ends and in the center of the shelf 112. In FIGS. 21 and 22, ten shelves 112 with twenty large pellets 10 and underliners 79 disposed thereon are shown within the charging unit 100. However the specific number of shelves 112 and large pellets 10 shown is meant to be for illustrative purposes only. It can be readily appreciated by one skilled in the art that fewer or additional shelves 112 with fewer or additional large pellets 10 and underliners 79 may be used without departing from the original scope of the invention.

Figure 25:
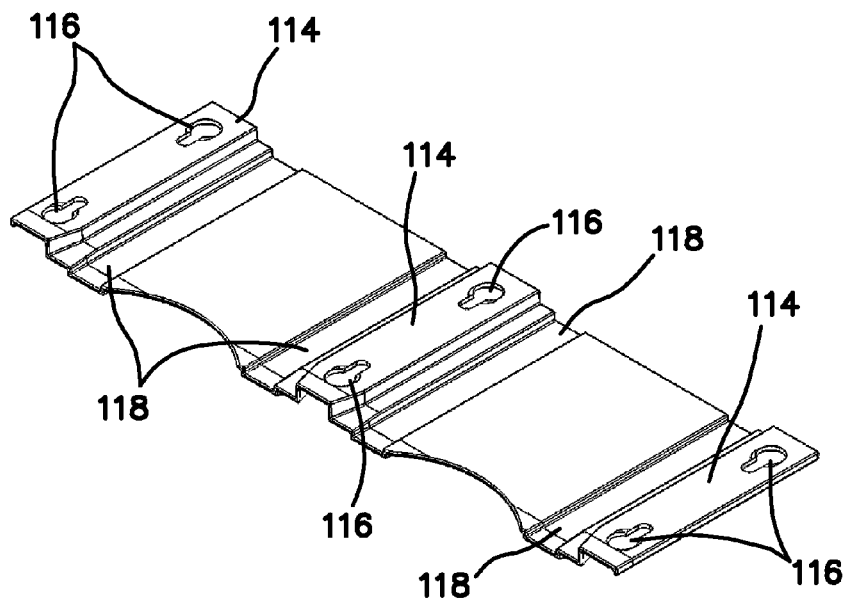
FIG. 25 is a top perspective of a shelf that is disposed within the charging unit.
Figure 26:
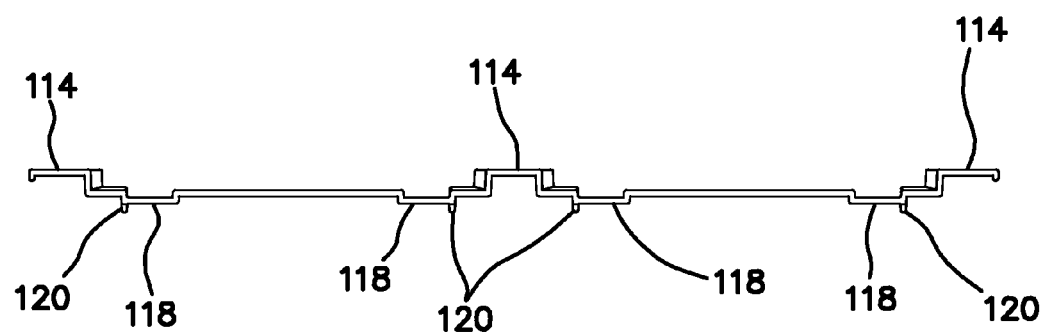
FIG. 26 is a frontal plan view of the shelf seen in FIG. 25.

Each shelf 112 is reversible, or in other words, each shelf 112 may accommodate and support either two large pellets 10 and attached underliners 79 on one surface, and two small pellets 1 on the opposing surface. As best seen in FIGS. 25 and 26, each shelf 112 comprises at least three mounts 114 which are coupled to the rods 110 via a plurality of apertures 116. Each shelf 112 also comprises two pairs of parallel troughs 118 defined into its surface. On the opposing surfaces of each of the troughs 118 is a ridge 120 which is disposed along the outside edge of each trough 118 across the entire width of the shelf 112 as seen in FIG. 29.

Figure 23:
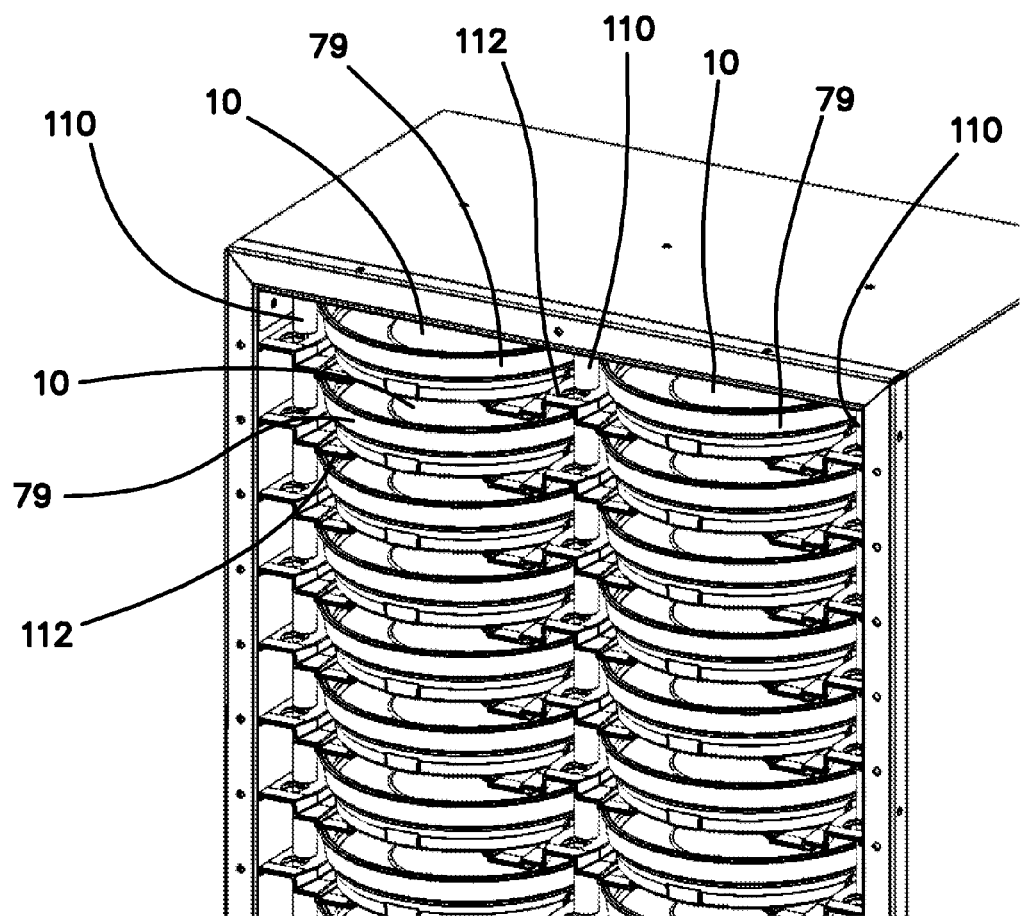
FIG. 23 is a magnified perspective view of the charging unit seen in FIG. 21.
Figure 27:
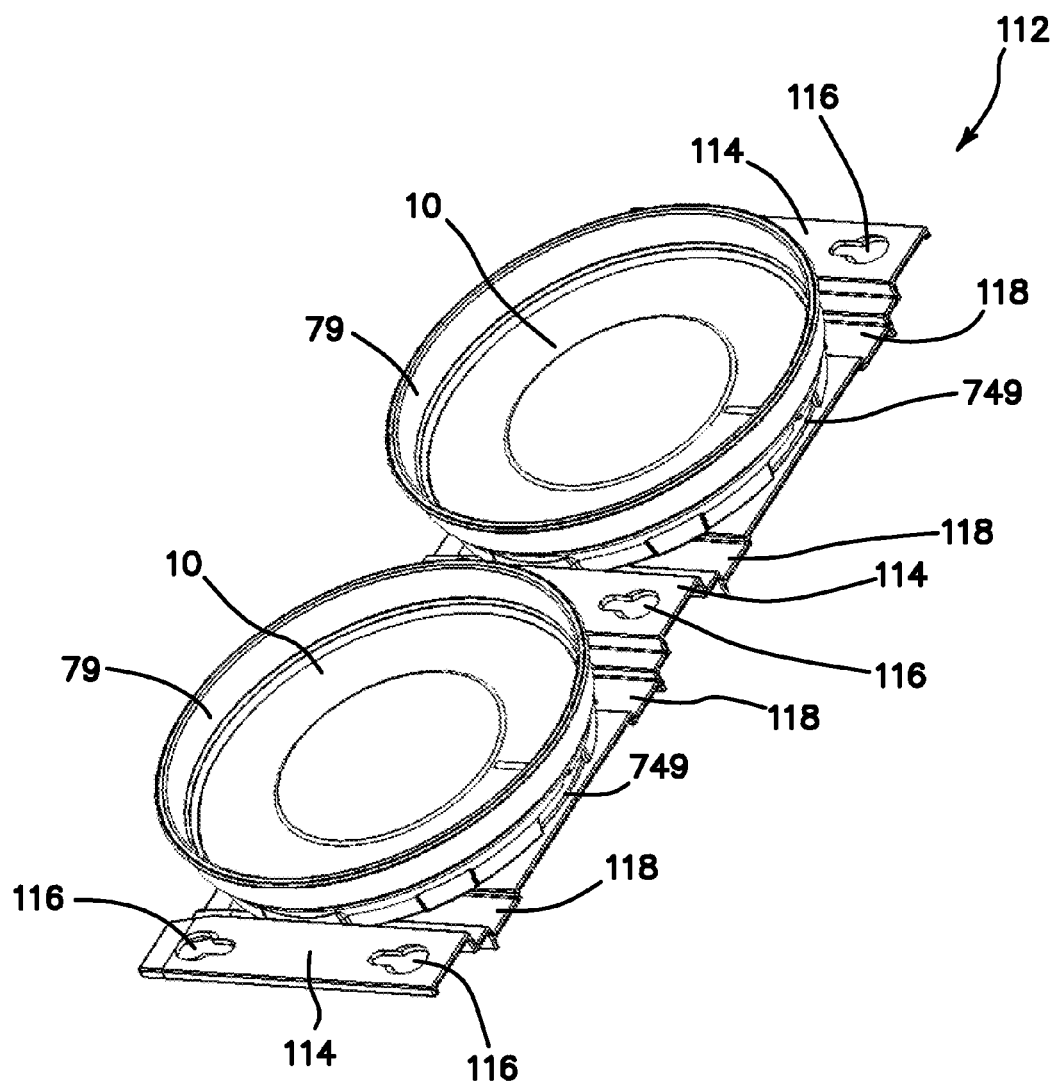
FIG. 27 is a perspective view of the shelf seen in FIG. 25 with a pair of large pellets and underliners disposed thereon.
Figure 28:
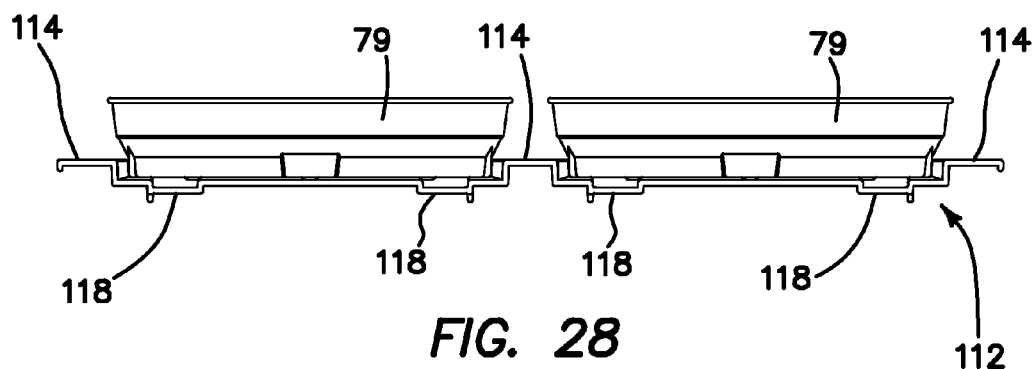
FIG. 28 is a frontal plan view of the shelf seen in FIG. 26 with a pair of large pellets and underliners disposed thereon.

FIGS. 27 and 28 depict the shelf 112 when it is configured to accommodate and support two large pellets 10 and their respective underliners 79. A large pellet 10 and corresponding underliner 79 is disposed onto the shelf 112 by first lining up the parallel pair of rails 2520 disposed on the bottom surface 250 of the large pellet 10 with a parallel pair of troughs 118 defined into the shelf 112. The rails 2520 are then inserted into the parallel troughs 118 and the large pellet 10 and underliner 79 are then slid into the shelf 112 with the access port 749 and plurality of pins 50, 60, 70, 310 facing the back portion 106 of the charging unit 100. As the large pellet 10 and underliner 79 are being slid through the troughs 118 of the shelf 112, the rails 2520 keep the large pellet 10 from moving side to side within the shelf and ensures that the access port 749 is properly aligned with a socket 122 of the charging unit 100 as will be described in further detail below. The process of aligning the large pellet 10 and underliner 79 and then sliding them into the shelf 112 may then be repeated for the other half of the shelf 112 as seen in FIGS. 27 and 28 for as many shelves 112 as there are present within the charging unit 100 as seen in FIGS. 21-23.

Figure 30:
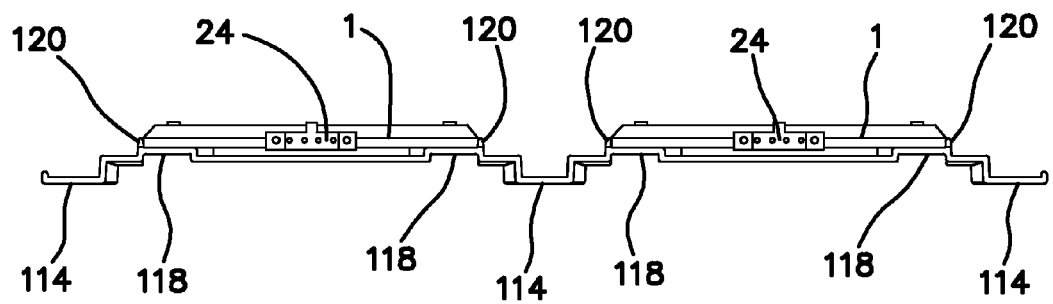
FIG. 30 is a rear plan view of the shelf seen in FIG. 29 with a pair of small pellets disposed thereon.
Figure 29:
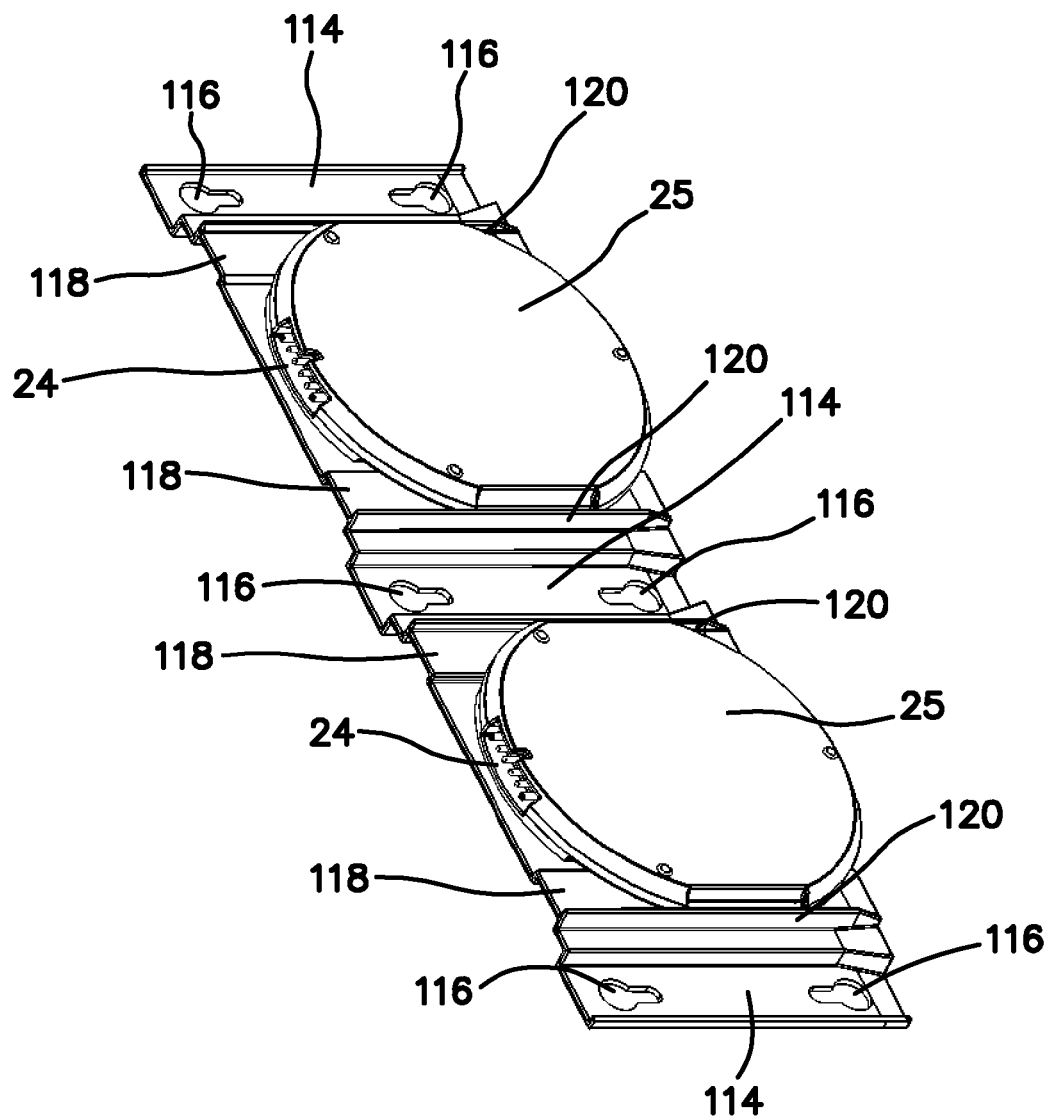
FIG. 29 is a perspective view of the opposing surface of the shelf seen in FIG. 25 with a pair of small pellets disposed thereon.
Figure 31:
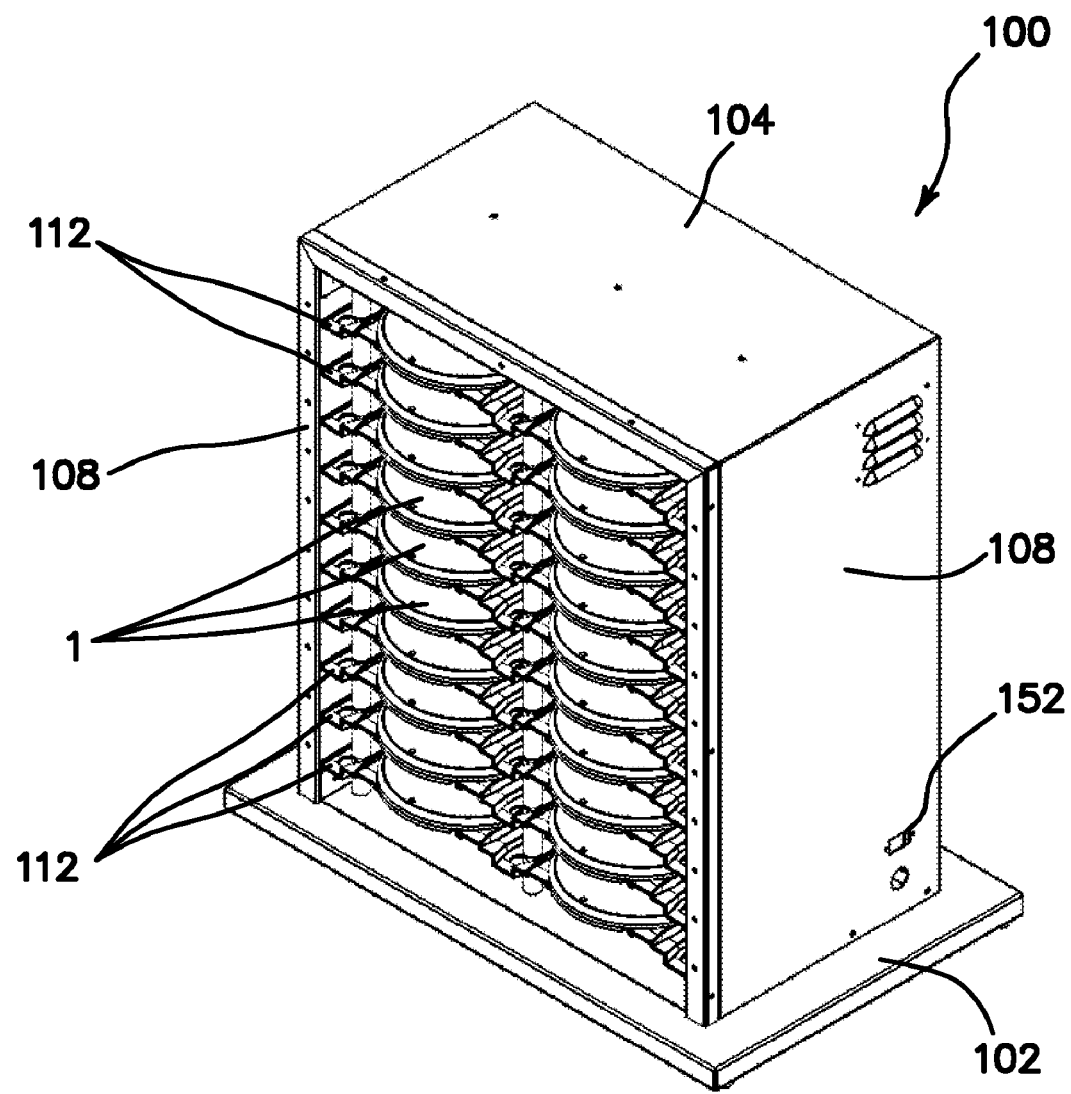
FIG. 31 is a perspective view of a charging unit embodiment according to the present invention with a plurality of small pellets inserted into it.
Figure 32:
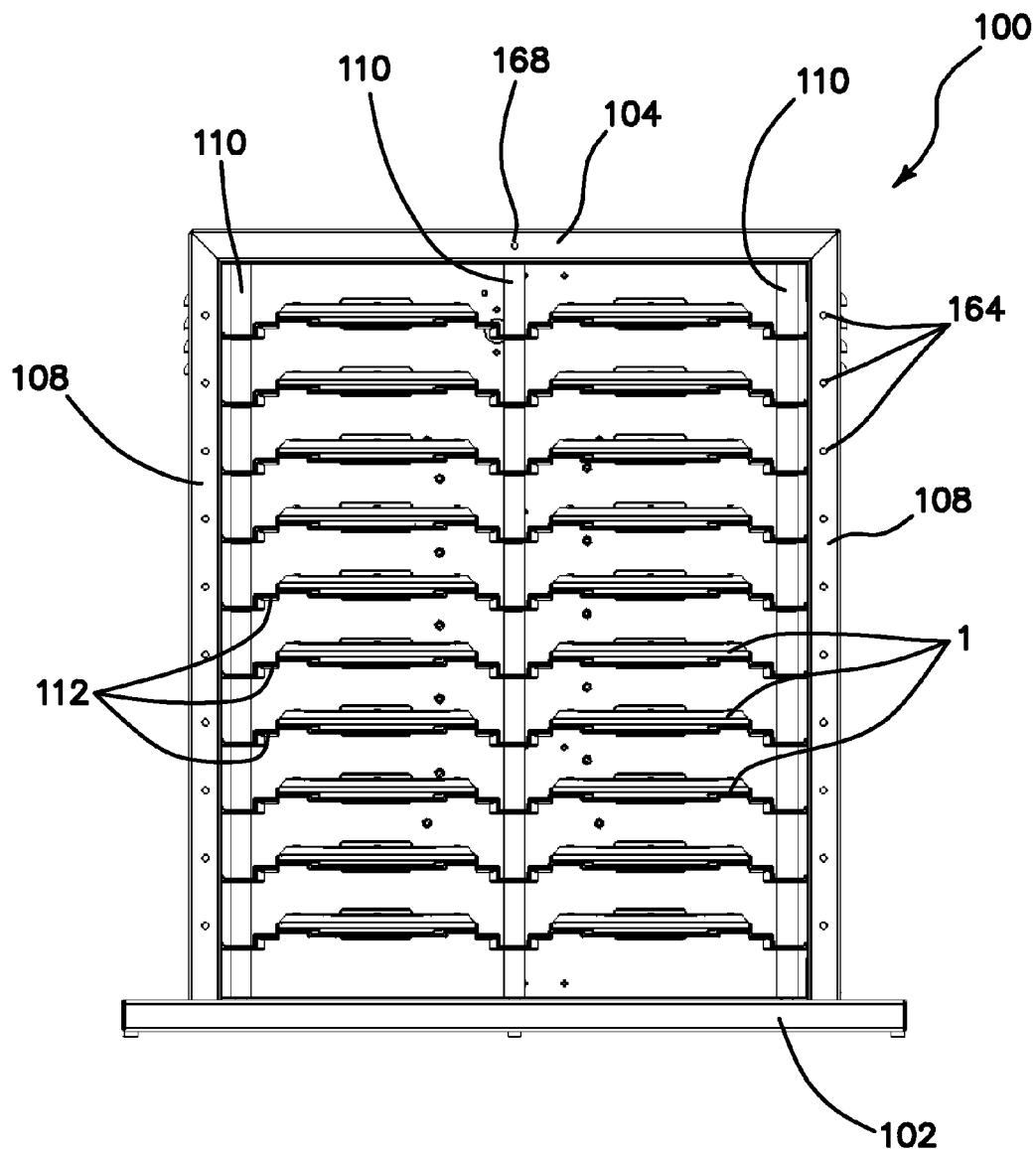
FIG. 32 is a frontal plan view of the charging unit seen in FIG. 31.

FIGS. 29 and 30 depict the shelf 112 when it is configured to accommodate and support two small pellets 1. A small pellet 1 is disposed onto the shelf 112 by first inverting the small pellet 1 and exposing its bottom surface 25. The small pellet 1 is then inserted between a parallel pair of ridges 120 disposed along the troughs 118. The small pellet 1 is then slid into the shelf 112 with the recess 24 and plurality of pins 5, 6, 7, 31 facing the back portion 106 of the charging unit 100. As the small pellet 1 is being slid over the troughs 118 of the shelf 112, the ridges 120 keep the small pellet 1 from moving side to side within the shelf 112 and ensures that the recess 24 is properly aligned a socket of the charging unit 100 as will be described in further detail below. The process of aligning the small pellet 1 between the ridges 120 and then sliding it into the shelf 112 may then be repeated for the other half of the shelf 112 as seen in FIGS. 29 and 30 for as many shelves 112 as there are present within the charging unit 100 as seen in FIGS. 31-33.

Figure 33:
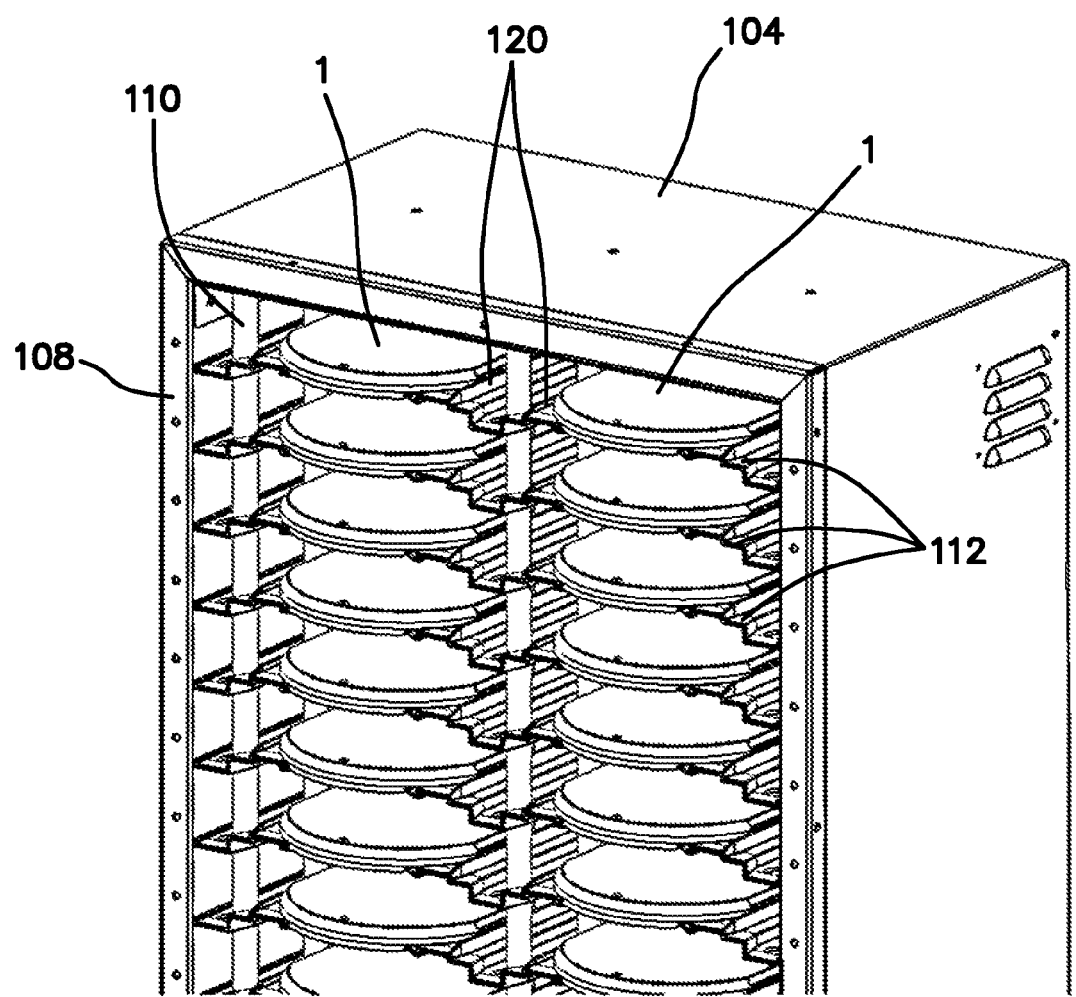
FIG. 33 is a magnified perspective view of the charging unit seen in FIG. 31.

While it is seen in FIGS. 21-23 and FIGS. 31-33 that only a plurality of large pellets 10 or a plurality of small pellets 1 are inserted into the charging unit 100 respectively, it is to be expressly understood that a mixture of both small pellets 1 and large pellets 10 may be inserted into the interior of a single charging unit 100 contemporaneously. For example, a user may orientate a selected number of the shelves 112 similar to that seen in FIG. 23 where the troughs 118 are exposed allowing the rails 2520 of the large pellets 10 to be slid in distally, while the remaining shelves 112 are orientated as seen in FIG. 33 with the ridges 120 exposed allowing the small pellets 1 to be slid distally there between. An infinite number of configurations or combinations of small pellets 1 and large pellets 10 may be inserted into the charging unit 100, all of which are well within the original scope of the invention.

Figure 24:
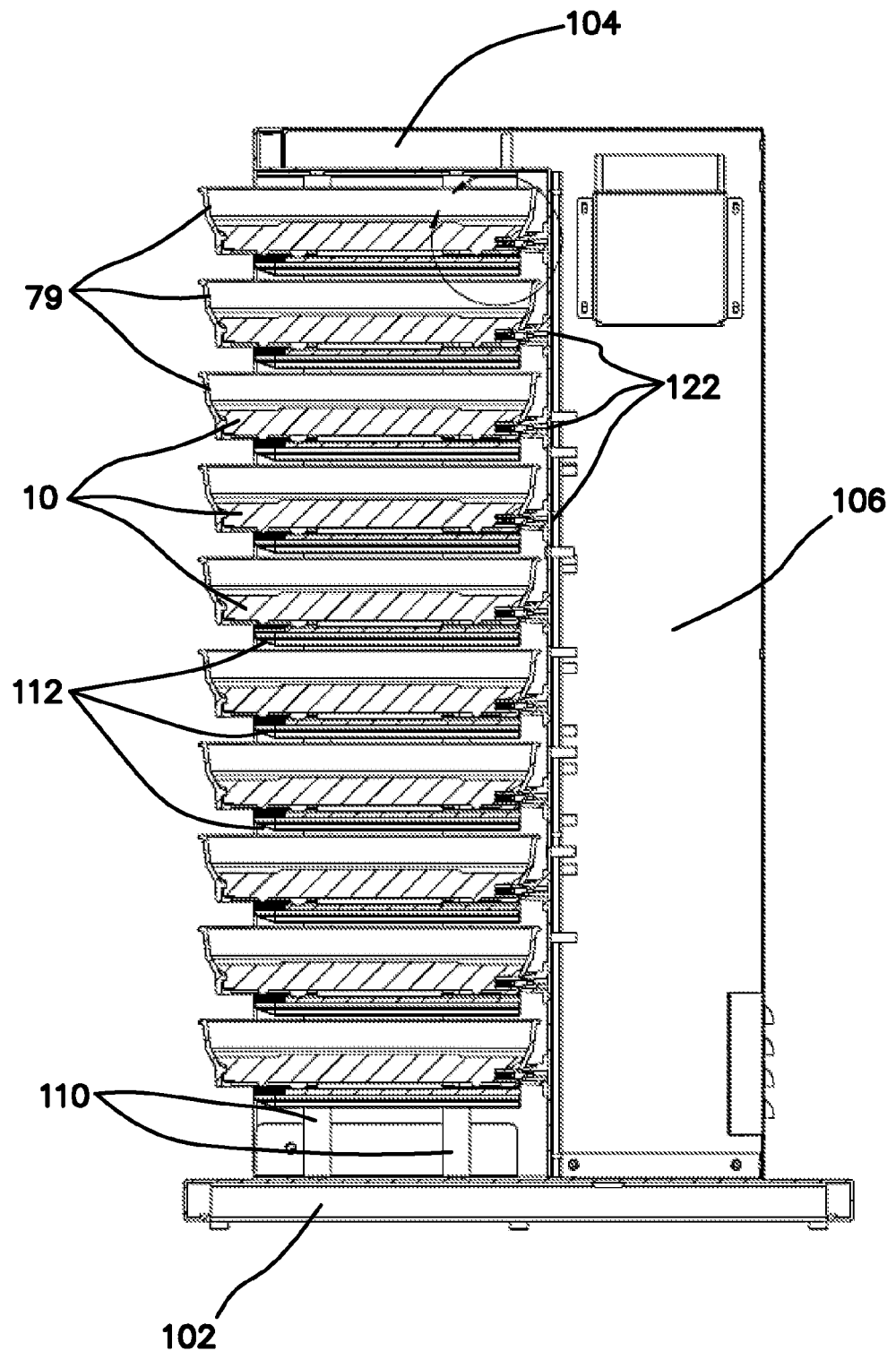
FIG. 24 is a side cross-sectional view of the charging unit and plurality of large pellets and underliners seen in FIG. 21.

The charging unit 100 also comprises a plurality of sockets 122 coupled to the back portion 106 of the charging unit 100 as seen in the cross sectional view of FIG. 24. The charging unit 100 comprises as many sockets 122 as there are small or large pellets 1, 10 to be inserted, specifically two sockets 122 for each shelf 122 for as many shelves 122 that are present within the charging unit 100.

Figure 34:
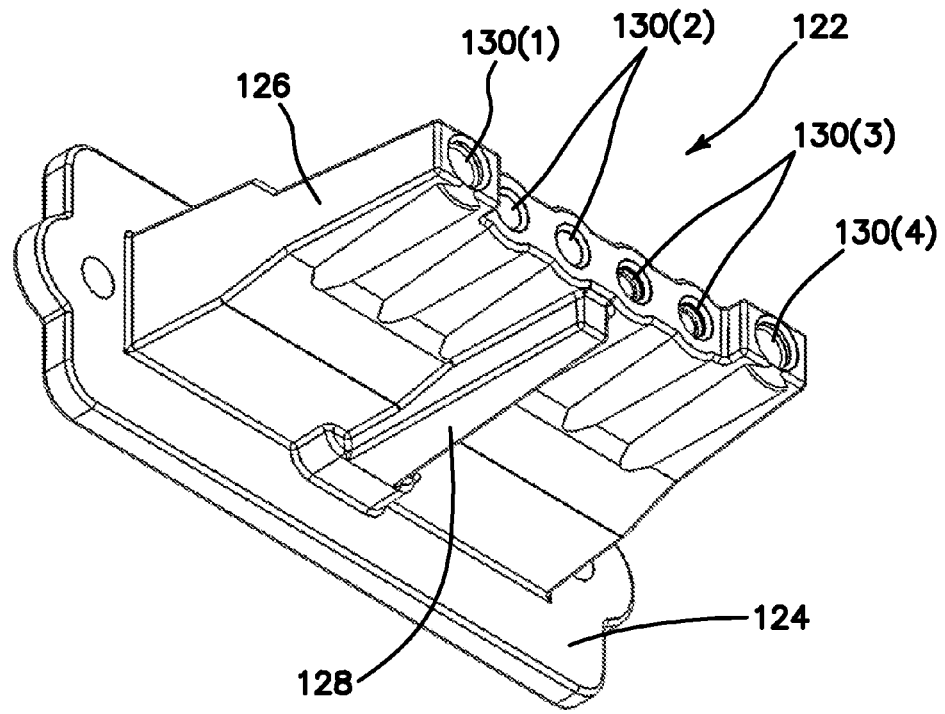
FIG. 34 is a perspective view of a socket that is disposed within the charging unit according to the present invention.
Figure 35:
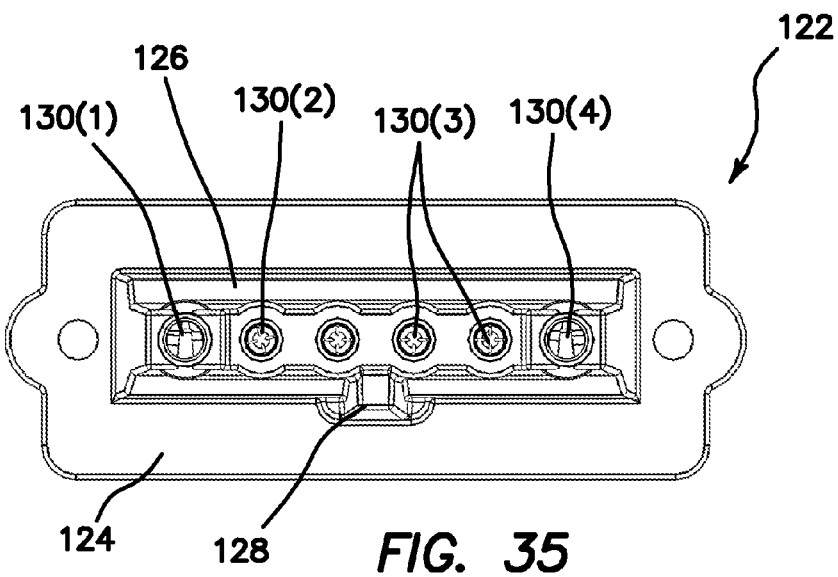
FIG. 35 is a top down plan view of the socket seen in FIG. 34.

Greater detail of the socket 122 can be seen in FIGS. 34 and 35. The socket 122 comprises a socket base 124 and a pin receiver 126 disposed thereon. Disposed along the length of one side of the pin receiver 126 is a male component 128. The male component 128 extends from the socket base 124 to the top of the pin receiver 126. The male component 128 is also substantially tapered in shape with a larger width at the bottom near the socket base 124 than at the top of the component 128 near the end of the pin receiver 126. The socket 122 is preferably comprised of injection molded plastic, however other light weight electrically insulating materials now known or later devised may also be used without departing from the original spirit and scope of the invention.

The pin receiver 126 comprises a plurality of female plugs 130(1-4) defined into the distal tip of the pin receiver 126. The "left" and "right" most plugs 130(1-4) as seen in FIGS. 34 and 35 is a left guide plug 130(1) and a right guide plug 130(4) respectively. Adjacent to the left guide plug 130(1) is a pair of loop plugs 130(2), and adjacent to the right guide plug 130(4) are a pair of power plugs 130(3). All of the plugs 130(1-4) are substantially cylindrical in shape however the left guide plug 130(1) and the right guide plug 130(4) project further out of the distal end of the pin receiver 126 than the loop plugs 130(2) or power plugs 130(3) as best seen in FIG. 34.

Figure 37:
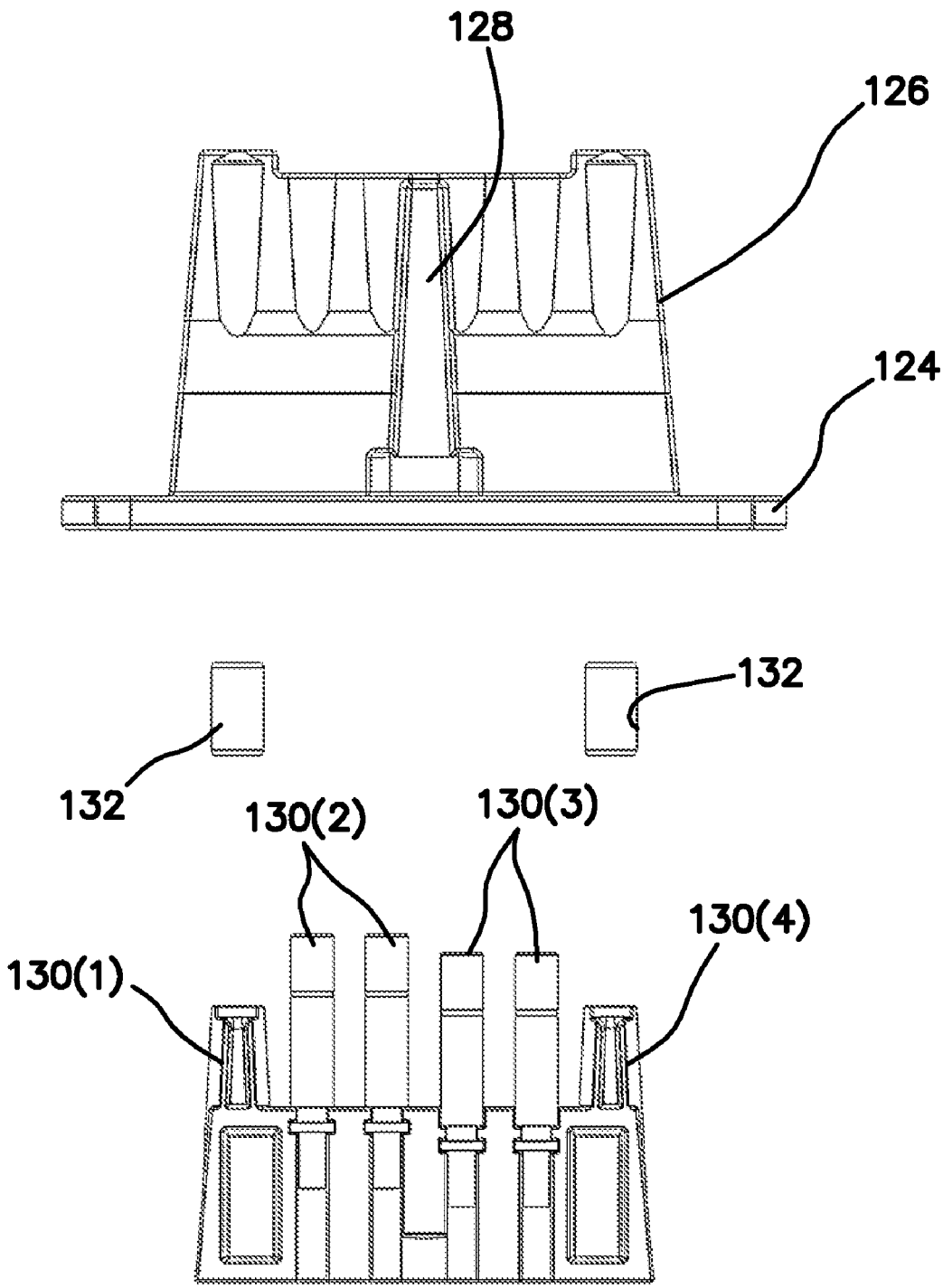
FIG. 37 is an exploded view of the internal components of the socket seen in FIG. 34.

An exploded view of the internal components of the socket 122 can be seen in FIG. 37. Both the left guide plug 130(1) and right guide plug 130(4) comprise a plug fitting 132 at their distal ends which extend the length of the guide plugs 130(1), 130(4) over that of the loop plugs 130(2) and power plugs 130(3). Both the left guide plug 130(1) and the right guide plug 130(4) are sized and shaped to accommodate the left guide pin 6, 60 and right guide pin 7, 70 of either the small pellet 1 or large pellet 10 respectively. The loop plugs 130(2) and power plugs 130(3) are substantially similar to each other in terms of size and shape, however as seen in FIG. 37, the power plugs 130(3) are staggered in a slightly higher position within the pin receiver 126 of the socket 122 than that of the loop plugs 130(2). The power plugs 130(3) and loop plugs 130(2) are sized and shaped to accommodate the power pins 31, 310 and the loop pins 5, 50 of either the small pellet 1 or large pellet 10 respectively. The proximal ends of the power plugs 130(3) and the loop plugs 130(2) are electrically coupled to the inner circuitry of the charging unit 100 through the socket base 124 as is described in further detail below.

Figure 36:
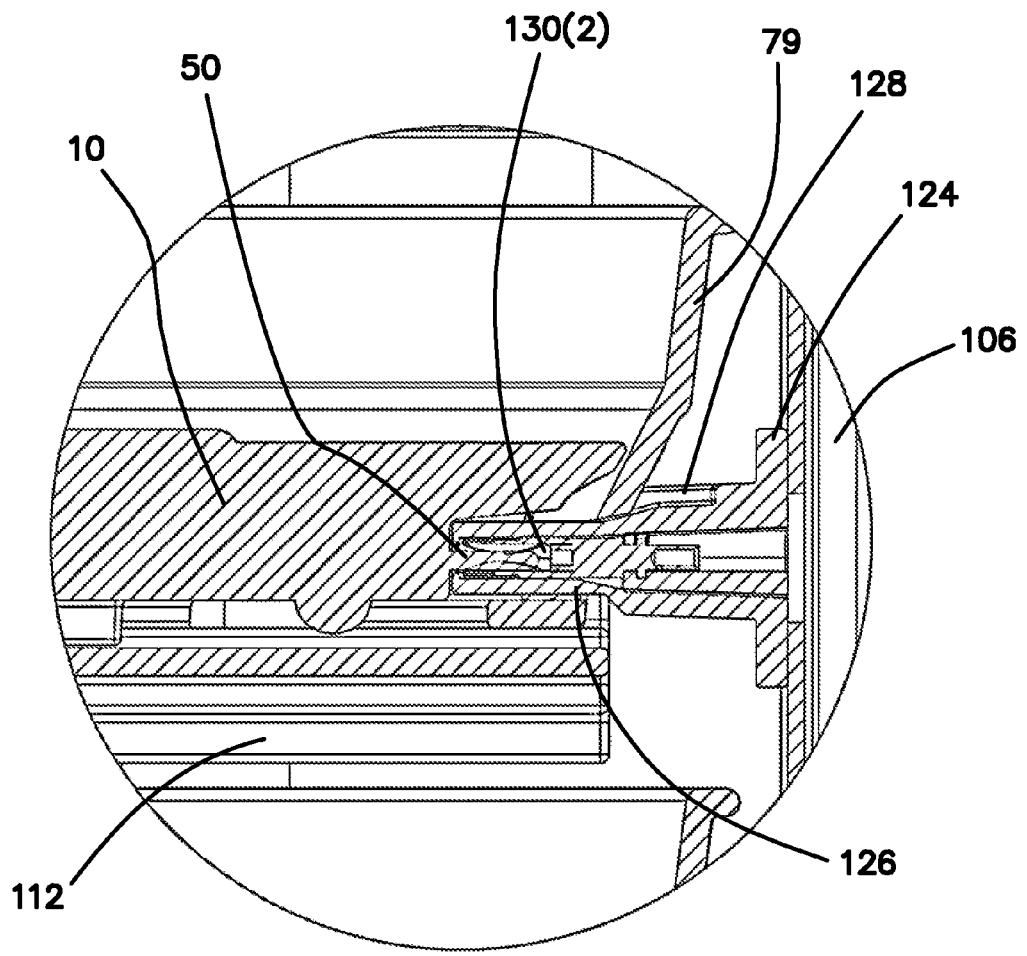
FIG. 36 is a side cross-sectional view of the socket disposed within the charging unit and coupled to a large pellet and underliner.

As a large pellet 10 and underliner 79 are slid onto a shelf 112 as disclosed above, the distal end of the pin receiver 126 of the socket 122 enters the aperture 29 of the underliner 79. As the large pellet 10 is further pushed into the charging unit 100, the pin receiver 126 enters the access port 749 of the large pellet 10. The left guide pin 60 and the right guide pin 70 of the large pellet 10 are then inserted into the left guide plug 130(1) and right guide plug 130(4) respectively. As the left guide pin 60 and right guide pin 70 are pushed further into their respective plugs 130(1), 130(4), the power pins 310 and loop pins 50 are also pushed into their respective plugs, specifically power plugs 130(3) for the power pins 310 and loop plugs 130(2) for loop pins 50. As the guide pins 60, 70 are inserted into the socket 122, due to their extended size and length as compared to that of the loop pins 50 and power pins 310, they serve to guide and orientate the body 20 of the large pellet 10 as it is being inserted into the socket 122 so that the remaining pins 50, 310 are properly matched up to their corresponding plugs 130 within the socket 122. The alignment of the pins 50, 310 with their corresponding plugs 130 of the socket 122 by the guide pins 60, 70 minimizes the stress placed on the power pins 310 and loop pins 50 and ensures that a proper electrical connection with the charging unit 100 is achieved. Because the power plugs 130(3) are in a staggered position above that of the loop plugs 130(2), the power pins 310 make electrical contact with the socket 122 before that of the loop pins 50. As the pins disposed on the large pellet 10 are being pushed into the stationary socket 122, the male component 128 disposed on top of the socket 122 as seen in the cross sectional view of FIG. 36 is inserted through the notch aperture 29 of the underliner 79 and then into the notch 28 itself that is defined into the large pellet 10. The insertion of the male component 128 further ensures that any lateral movement of the large pellet 10 is prevented and that proper alignment between it and the socket 122 is obtained.

Figure 38:
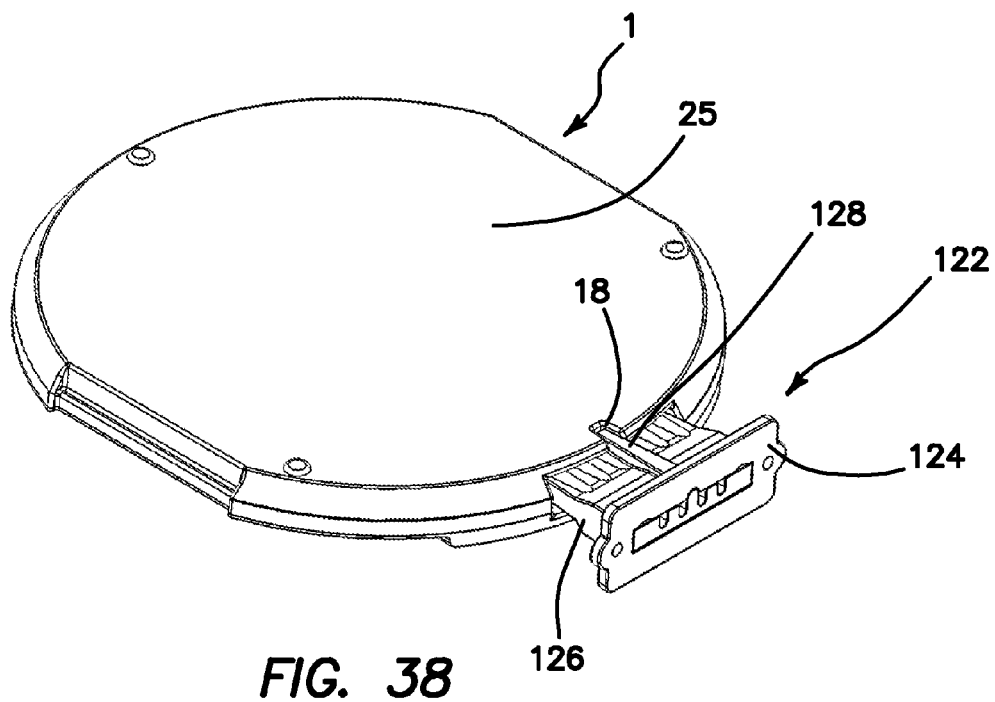
FIG. 38 is a perspective view of the socket when coupled to a small pellet, the small pellet being inverted so as to have the correct coupling orientation with the socket.
Figure 40:
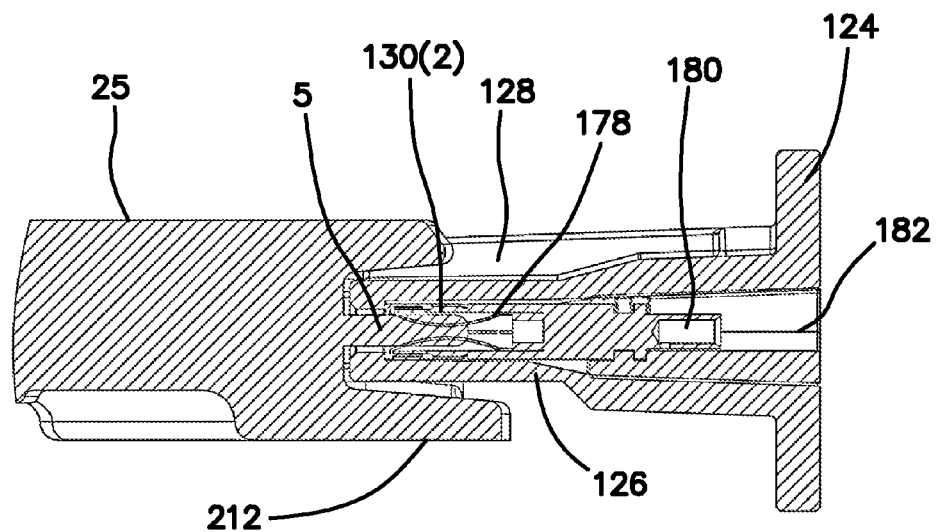
FIG. 40 is a magnified cross-sectional view of the coupling between the socket and small pellet seen in FIG. 38.
Figure 39:
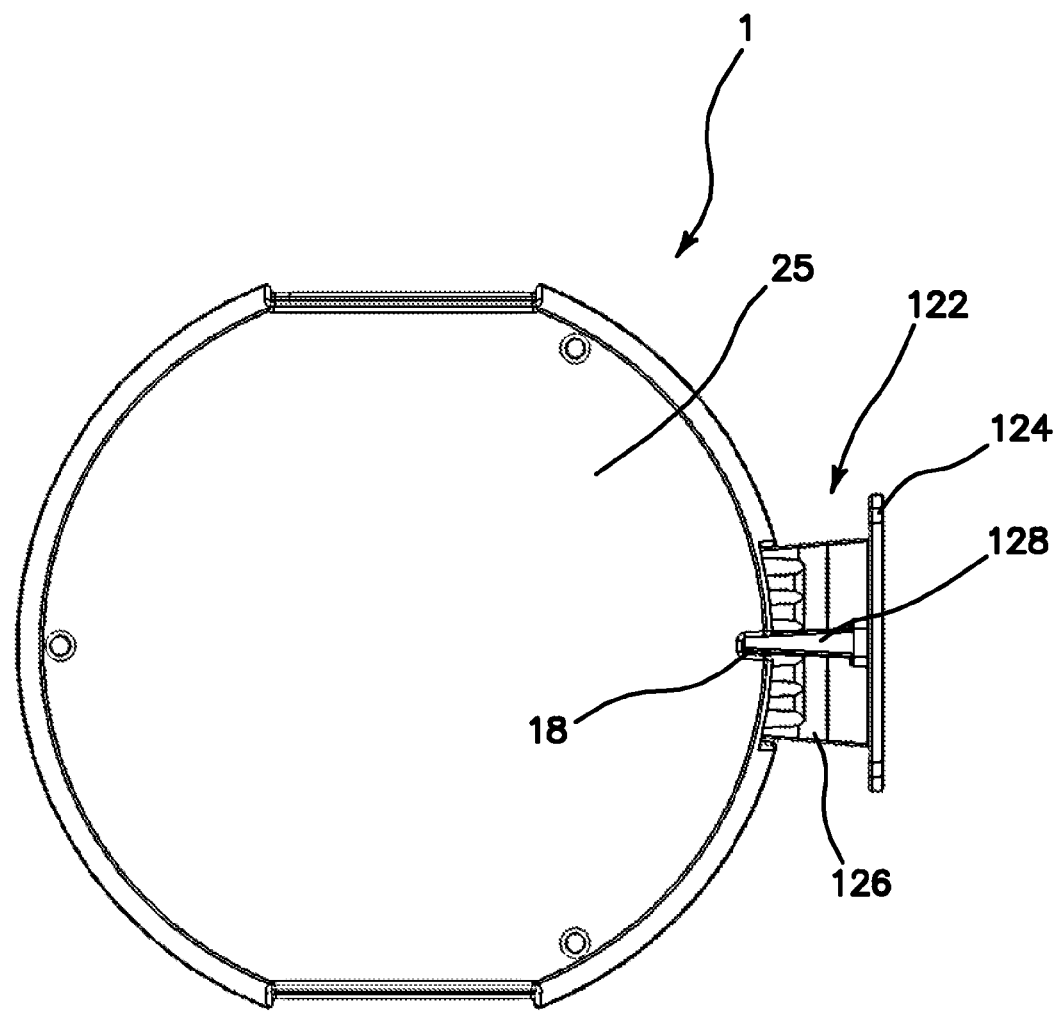
FIG. 39 is top down plan view of the coupling between the socket and small pellet seen in FIG. 38.

A similar coupling process is performed when a socket 122 is inserted into a small pellet 1 as seen in FIGS. 38-40. A small pellet 1 is first inverted exposing its bottom surface 25 and is then slid over an inverted shelf 122 as discussed above with respect to FIGS. 29-33. The small pellet 1 is inverted so that its loop pins 5 and power pins 31 are then orientated with the corresponding plugs 130(2), 130(3) of the socket 122. This allows the same socket 122 to be used interchangeably with both a small pellet 1 and a large pellet 10 without requiring the socket 122 to be changed or otherwise manipulated by a user. As the small pellet 1 is being slid along the parallel ridges 120 of the shelf 122, the pin receiver 126 enters the recess 24 of the small pellet 1. The left guide pin 6 and the right guide pin 7 of the small pellet 1, which have swapped positions due to the inversion of the small pellet 1, are then inserted into the left guide plug 130(1) and right guide plug 130(4) respectively. As the left guide pin 6 and right guide pin 7 are pushed further into their respective plugs, specifically left guide plug 130(1) for right guide pin 7 and right guide plug 130(4) for left guide pin 6, the power pins 31 and loop pins 5 are also pushed into their respective plugs, specifically power plugs 130(3) for the power pins 31 and loop plugs 130(2) for loop pins 5. As the guide pins 6, 7 are inserted into the socket 122, due to their extended size and length as compared to that of the loop pins 5 and power pins 31, they serve to guide and orientate the body 2 of the small pellet 1 as it is being inserted into the socket 122 so that the remaining pins 5, 31 are properly matched up to their corresponding plugs 130 within the socket 122. The alignment of the pins 5, 31 with their corresponding plugs 130 of the socket 122 by the guide pins 6, 7 also minimizes the stress placed on the power pins 31 and loop pins 5 and ensures that a proper electrical connection with the charger is achieved. Because the power plugs 130(3) are in a staggered position above that of the loop plugs 130(2), the power pins 31 make electrical contact with the socket 122 before that of the loop pins 5. As the pins disposed on the small pellet 1 are being pushed into the stationary socket 122, the male component 128 disposed on top of the socket 122 as seen in the top-down view of FIG. 39 and the perspective view of FIG. 38, is inserted into the notch 18 that is defined into the small pellet 1. The insertion of the male component 128 further ensures that any lateral movement of the small pellet 1 is prevented and that proper alignment between it and the socket 122 is obtained.

After a plurality of small pellets 1 or large pellets 10 or a combination thereof have been properly inserted into the charging unit 100, electrical current is then supplied to the pellets 1, 10 through each of the corresponding sockets 122 in a regulated manner. The flow of electric current is regulated by a controller board 150 disposed within the charging unit 100 and which is shown in block diagram form in FIG. 41. The charging unit 100 also comprises a power switch 152 as seen in FIGS. 21 and 31, an internal thermal switch 154 and a plurality of fans 156 which are electrically coupled to the controller board 150, but are not controlled by it. The software contained on the controller board 150 not only controls the current delivered to each pellet 1, 10, but also records the status of the heating of each pellet 1, 10.

External power is delivered from an external source to the charging unit 100 by manipulating the power switch 152 on one of the side walls 108 which enters the controller board 150 through a power inlet 158. From the power inlet 158, electrical current is sent to a voltage detector 160 and to a microcontroller 162. The voltage detector 160 comprises means for detecting the specific voltage of the incoming electrical current received at the power inlet 158 and relays that determined value to the microcontroller 162. The microcontroller 162 is a flash-based microcontroller as is known in the art which is used to control and regulate the current delivered to each of the pellets 1, 10, and by extension the temperature of pellets 1, 10, inserted into the charging unit 100. The microcontroller 162 also serves as a means for indicating to a user whether or not a particular pellet 1, 10 is sufficiently warm by illuminating a plurality of LED pellet status lights 164 disposed in the front faces of the side walls 108, one pellet status light 164 being disposed for each corresponding pellet 1, 10 inserted into the charging unit 100 as seen in FIGS. 22 and 32. In addition, the microcontroller 162 may also indicate the general status of the charging unit 100 itself by illuminating a LED main status light 168 disposed on the front face of the top surface 104 as also seen in FIGS. 22 and 32. The microcontroller 162 also comprises means for interfacing with a Universal Serial Bus (USB) port 166 disposed within the controller board 150.

Also coupled to the microcontroller 162 is a non-volatile memory 170, an on-board temperature monitor 172, a real time clock 174, and an in-circuit serial programming (ICSP) device 176. The non-volatile memory 170 is a standard ROM or FLASH memory chip that is well known in the art that is capable of retaining data even when the unit 100 is powered down. The on-board temperature monitor 172 comprises means for measuring and monitoring the temperature of the controller board 150 itself anywhere within the range of 20° C. to 80° C. The ICSP device 176 facilitates updating software that is contained on the microcontroller 162 without having to remove it or any other components from the controller board 150. Finally, the real time clock (RTC) 174 comprises the means to track relative time and is used as part of logging various events recorded by the controller board 150 as will be further detailed below. The RTC 174 comprises a replaceable battery to maintain the ability to log events while the unit 100 is powered down.

The controller board 150 and its various components are robust and can operate in temperatures ranging from −20° C. to 80° C. and can be further stored at temperatures between −40° C. to 125° C. The controller board 150 also comprises a conformal coating which allows it to be operated in humidity up to 95% non-condensing and withstand the possibility of errant sprays of water.

While the below description specifically details the insertion and warming process of a small pellet 1, for ease of understanding it is to be expressly understood that a substantially similar process is also performed with respect to the large pellet 10.

After the charging unit 100 has been powered on and initialized, a small pellet 1 is slid into the charging unit 100 as described above. Due to the staggered configuration of the power plugs 130(3) and loop plugs 130(2) shown in FIG. 37, the power pins 31 are electrically coupled into the power plugs 130(3) before the loop pins 5 are electrically coupled into the loop plugs 130(2). As the loop pins 5 are inserted into the loop plugs 130(2), the pins 5 make contact with a lead 178 within each of the plugs 130(2). In the base of the loop plugs 130(2) is a detection shunt 180 which is coupled to the microcontroller 162 and power supply 158 through a main 182. The power supply 158 constantly supplies power to each of the detection shunts 180 within each of the plurality of sockets 122 within the charging unit 100. Once the loop pins 5 make contact with the lead 178 as seen in FIG. 40, a complete circuit is formed with the detection shunt 180 as is known in the art and the corresponding pellet status indicator 164 disposed on the side wall 108 adjacent to the just inserted pellet 1 is illuminated red indicating to a user that the pellet 1 has been successfully inserted into the socket 122. A signal is also sent to the microcontroller 162 of the controller board 150 after the pair of loop pins 5 have been properly inserted and thus informing the microcontroller 162 that a pellet 1 has been docked within the charging unit 100 at that particular shelf and position.

With the pellet 1 in place, the microcontroller 162 then signals the power supply 158 to provide power the power plugs 130(3) of the socket 122. The power plugs 130(3) conduct the received electricity into the power pins 31 of the pellet 1 as known in the art which in turn conduct the electrical current through the filament 30 in the body 2 of the pellet 1 at about 1.4 Amps. The filament 30 provides sufficient resistance such that thermal heat is created which turn heats the body 2 of the pellet 1. It is important to emphasize that in order for power to be supplied to the power plugs 130(3) and thus the pellet 1, the loop pins 5 must first complete a circuit with the detection shunt 180. If a circuit is not formed, the pellet status indicator 164 will not illuminate and power will not be supplied to the power plugs 130(3). This two step coupling process decreases the probability of arcing between the socket 122 and the pellet 1.

Figure 41:
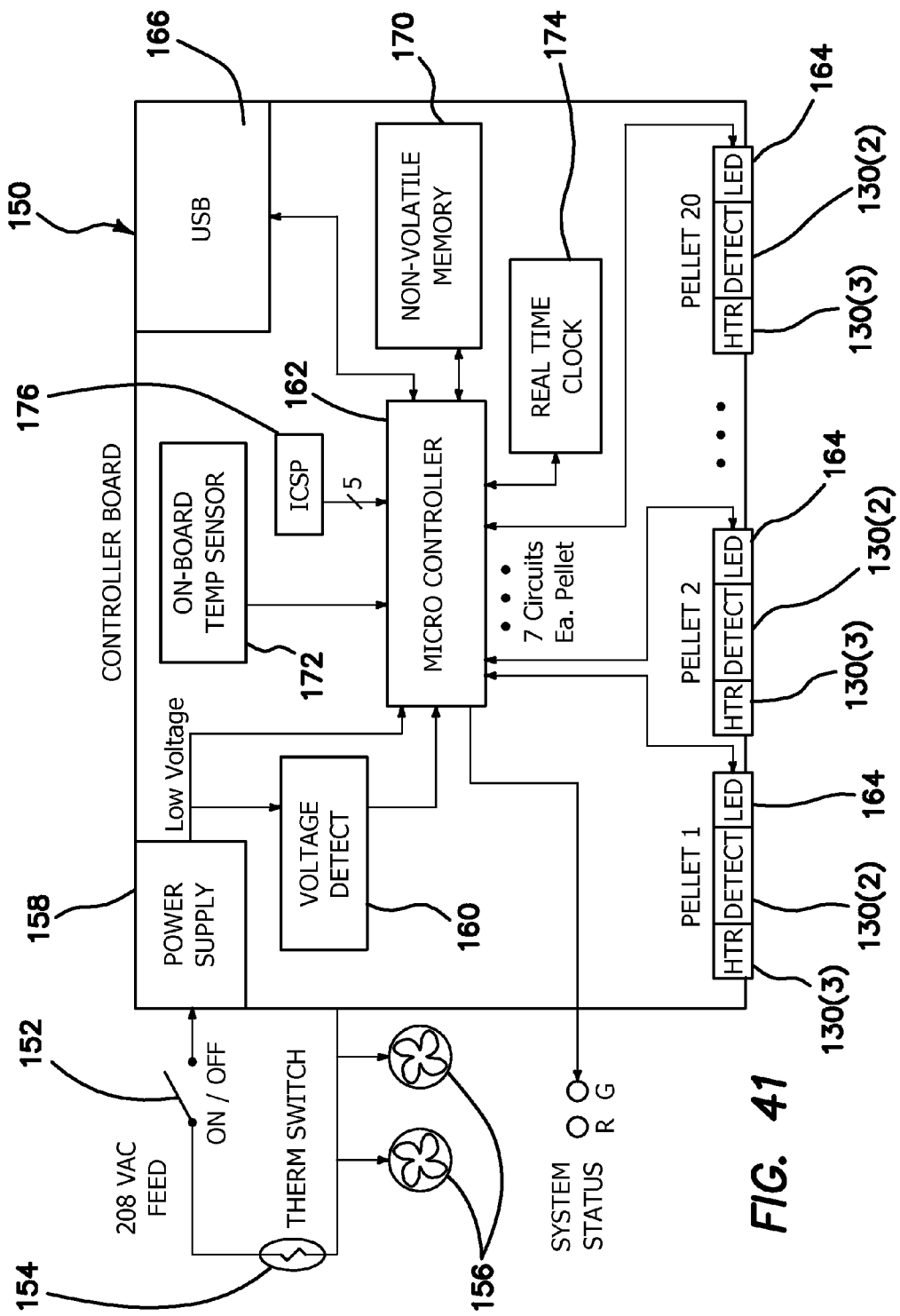
FIG. 41 is a block diagram of the controller board and internal components disposed within the charging unit.
Figure 43:
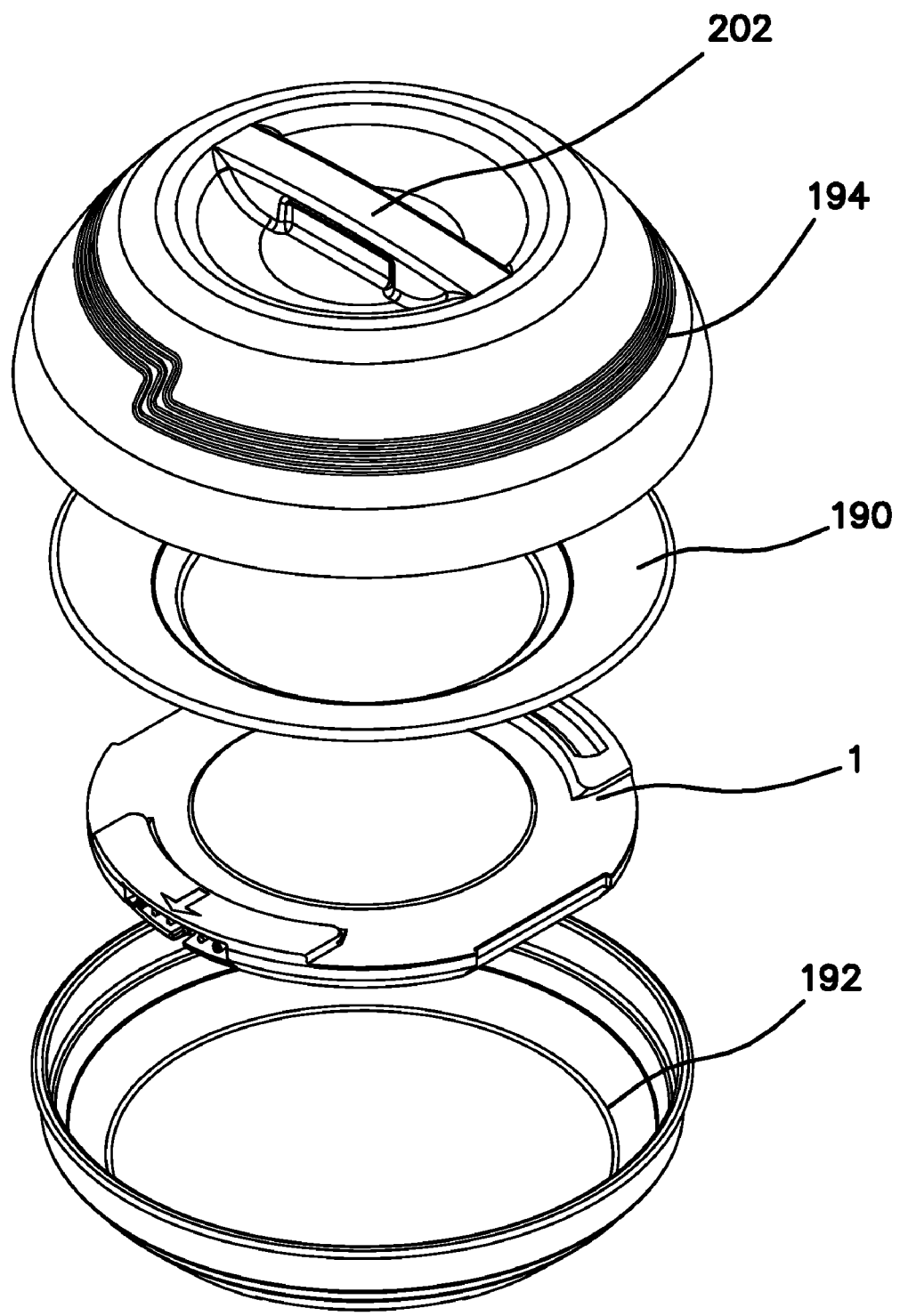
FIG. 43 is an exploded view of the components used with a small pellet in order to keep comestible goods at an elevated temperature including a dome, plate, and the tray seen in FIG. 42.

As disclosed above and as seen in FIG. 41, the controller board 150 comprises means for detecting and supplying power to a plurality of pellets 1, 10 contemporaneously. Each socket 122 within the charging unit 100 comprises its own individual detection and power circuits as disclosed above which allows the microcontroller 162 to recognize when a pellet 1, 10 has been inserted into a specific position anywhere within the charging unit 100.

After the pellet 1 has been inserted, the microcontroller 162 records the position of the pellet 1 within the charging unit 100 and time of insertion via the RTC 174 into the non-volatile memory 170. Power is supplied to the inserted pellet 1 for a predetermined amount of time as determined by the voltage supplied by the external power source (not shown). For example, if the voltage of the external source is 208-220 V, power is supplied to the pellet 1 for four minutes. After the end of the four minutes as determined by the RTC 174, the flow of power to the pellet 1 is stopped by the microcontroller 162 and the pellet status indicator 164 is changed from red to green notifying the user that the pellet 1 is now sufficiently warm and may be removed from the charging unit 100. If the voltage of the external source is lower than 208 V or higher than 220 V, the amount of time that power is supplied to the pellet 1 may be lengthened or shortened accordingly by the internal programming contained within the microcontroller 162.

In one embodiment, if the pellet 1 is not removed from the charging unit 100 after the initial period of power supply has been completed, the microcontroller 162 and RTC 174 then initiate a cycling program which maintains the pellet 1 at a sufficiently warm temperature for as long as it is inserted into the charging unit 100. For example, depending upon on the voltage of the external source, the microcontroller 162 will alternate the power being supplied to the pellet 1 on and off for predetermined amounts of time. For an external source voltage of 208-220 V, for instance, the microcontroller 162 will prevent power from flowing to the pellet 1 for two minutes, then allow power to the pellet 1 for thirty seconds, and then prevent flow for another two minutes and so on. This cycling of heating and cooling down periods allows the pellet 1 to consistently maintain the heat generated from the initial heating up period while preventing overheating of the pellet 1 and possible damage to the filament 30. If the voltage of the external source is lower than 208 V or higher than 220 V, the duration of each on and off cycle of power that is supplied to the pellet 1 may be altered accordingly by the internal programming contained within the microcontroller 162.

In another embodiment, if after an extended amount of time has elapsed and none of the plurality of pellets 1 contained within the charging unit 100 have been removed after their initial charge and subsequent cycling, and no new pellets 1 have been inserted, a system wide timeout is initiated by the controller board 150. The RTC 174 comprises means for monitoring the elapsed time that has taken place since at least one pellet 1 was either removed from or inserted into the charging unit 100. When the elapsed time for inactivity has passed a predetermined threshold, the microcontroller 162 stops all power flow to all of the pellets 1 currently inserted into the charging unit 100 allowing each pellet 1 to slowly cool. Each pellet status indicator 164 is then turned off and the main status light 168 in the top portion 104 of the charging unit 100 is illuminated with a red LED light notifying the user that the charging unit 100 is offline or is otherwise not heating the pellets 1. In order to resume charging or the cycling of power to the pellets 1, the power switch 152 must be manipulated by the user to the off position and then back to the on position. Once back on, the charging unit 100 will charge the pellets 1 as described above and then continue to cycle power on and off to the pellets 1 until the threshold inactive time as tracked by the RTC 174 has once again elapsed. Should a pellet 1 be inserted or removed from the charging unit 100 before the threshold inactive time is reached, the RTC 174 restarts the inactive elapsed time from zero.

In another embodiment, the controller board 150 comprises the on-board temperature monitor 172 which monitors the temperature of the controller board 150 itself. If the controller board 150 exceeds a predetermined threshold temperature, preferably 75° C., a signal is sent from the on-board temperature monitor 172 to the microcontroller 162. The microcontroller 162 logs the event in the non-volatile memory 174 and then signals the sockets 122 to stop all power flow to the pellets 1, allowing each pellet 1 to slowly cool. Each pellet status indicator 164 is then turned off and the main status light 168 in the top portion 104 of the charging unit 100 is illuminated with a red LED light notifying the user that the charging unit 100 is offline or is otherwise not heating the pellets 1. In order to resume charging or the cycling of power to the pellets 1 after the controller board 150 has cooled, the power switch 152 must be manipulated by the user to the off position and then back to the on position. Once back on, the charging unit 100 will charge the pellets 1 as described above and then continue to cycle power on and off to the pellets 1 until the threshold temperature of the controller board 150 has been exceeded as determined by the on-board temperature monitor 172.

In a further embodiment, the controller board 150 provides means for detecting and notifying a user if there is a power error present within an inserted pellet 1, 10. Once the presence of a pellet 1 has been detected as described above, the microcontroller 162 initiates a continuity test between the socket 122 and its respective pellet 1 by sending are electronic continuity signal to the socket 122. If the signal returns from the socket 122, it is determined by the microcontroller 162 that a successful coupling between the socket 122 and pellet 1 is present and power from the power supply 158 is allowed to enter the pellet 1. If the continuity signal sent to the socket 122 is not returned, a series of additional continuity signals are sent to the socket 122. If still no return signal is received, it is determined by the microcontroller 162 that an error exists in the coupling between the socket 122 and pellet 1 and logs the error event in the non-volatile memory 170. The error may be caused by a broken power pin 31 on the pellet 1 or an incomplete coupling between the power pins 31 and the power plugs 130(3), however no matter the cause, when an error is detected, power is prevented from entering the pellet 1 and the corresponding pellet status indicator 164 is illuminated with a flashing red LED light. The entire continuity test process preferably occurs within the first five seconds of the pellet 1 being detected within the socket 122 as determined by the RTC 174 so as to give real-time notice to the user to remove the pellet 1 and attempt to re-insert it, or to discard the pellet 1 entirely. If a faulty pellet 1 is removed from the charging unit 100, the corresponding pellet status indicator 164 is reset and the socket 122 is ready to receive a new or different pellet 1.

As described above and seen in FIG. 41, a USB port 166 is coupled to the microcontroller 162 and allows a user to connect their PC or laptop computer to the controller board 150 and service or view the operational history of the charging unit 100. After establishing a connection via the USB port 166, a user may access the programming of the microcontroller 162 and view the data contained on the non-volatile memory 170 through a standard software interface as is known in the art. If the charging unit 100 requires servicing, the user enters the date of service which is recorded onto the non-volatile memory 170 which then becomes part of the operational history of the charging unit 100. With access established to the microcontroller 162, the user may change the system wide timeout threshold value, that is, the amount of inactive time that may elapse without the insertion or removal of any of the plurality of pellets 1 before the charging unit 100 goes offline and stops power flow to the pellets 1 contained within it. The user may select the timeout threshold value from a predetermined list of ten, fifteen, twenty, thirty, or sixty minutes, however other time values not listed here may also be used without departing from the original spirit and scope of the invention.

In another embodiment, the user may download the contents of the non-volatile memory 170 onto their PC or laptop via the USB port 166. The contents of the non-volatile memory 170 that may be viewed and downloaded include the maximum and minimum temperature values of the controller board 150 as measured by the on-board temperature sensor 172. Other data values include the total time the charging unit 100 has been powered on, how many pellets 1 have been inserted into each respective position within the charging unit 100 and how many heating and cool down cycles each pellet 1 went through, how many times the charging unit 100 powered down after reaching the threshold for inactivity, and how many "short cycles" had taken place, namely how many times the charging unit 100 was turned off before the initial heating and cool down cycle of the pellets 1 had been completed.

Once the pellet 1 has been coupled to the socket 122 of the charging unit 100 for the predetermined amount of time as determined by the microcontroller 162, the body 2 of the pellet 1 is now fully resistively heated from the heating element 33 contained within it. The user may then remove the pellet 1 from the charging unit 100 by sliding the pellet 1 towards themselves in the proximal direction across the shelf 112 that it is disposed upon. As the pellet 1 is slid back, each of the pins 6, 7, 5, 31 disposed the pellet 1 slide out of each of their respective plugs 130 of the socket 122. Because of the staggered configuration of the power plugs 130(3) to that of the loop plugs 130(2), the loop pins 5 of the pellet 1 break electrical contact with the socket 122 before the power pins 31 do. With the loop pins 5 removed, the circuit with the detection shunt 180 is broken and any power flow to the power plugs 130(3) is ceased by the microcontroller 162 before the power pins 31 are themselves electrically removed from the socket 122. By stopping the current between the power plugs 130(3) and power pins 31 before the power pins 31 are removed from the socket 122, the chance of electric shock or arcing between the plugs 130 and power pins 31 is eliminated. After the pins 5, 6, 7, 31 have cleared the socket 122, the pellet 1 is slid proximally towards the user and off of the shelf 112. A new, unheated pellet 1 may then be inserted into its place and the entire heating process is repeated.

After a large pellet 10 has reached a sufficiently warm temperature by the means described above, it is removed from the charging unit 100 and a plate 190 with comestible goods disposed thereon is arranged on its top surface 210. Due to the relief central portion 2110 of the top surface 21, the plate 190 is disposed on the large pellet 10 in a stable position surrounded by the underliner 79. The underliner 79 not only maintains a safe contact surface between the hot large pellet 10 and a user, but also prevents the partial transfer of heat away from the large pellet 10 to an adjacent surface and thus keeps the comestible goods sufficiently heated for an increased amount of time than would otherwise be possible.

After a small pellet has reached a sufficiently warm temperature by the means described above, it is removed from the charging unit 100 and is placed in a tray 192 seen in FIG. 41. The tray 192 is circular in shape and is large enough to accommodate the entirety of the small pellet 1 on a bottom tray surface 200. The tray 192 comprises a wall 196 that extends higher than the top surface 21 of the small pellet 1 and a plurality of feet 198 which help it maintain a stable position for it and the small pellet 1 contained within it.

Figure 42:
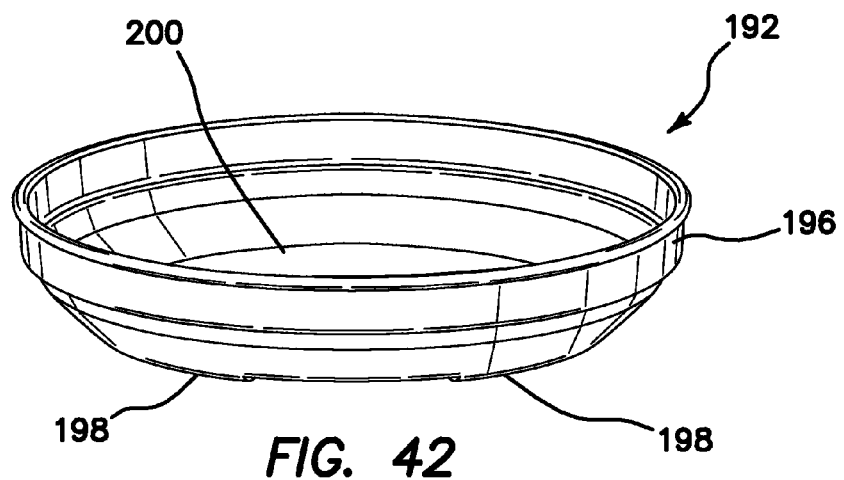
FIG. 42 is a perspective view of a tray that accommodates the small pellet in an alternative embodiment according to the present invention.

After a small pellet 1 has been placed within the tray, a plate 190 is in turn is placed on the top surface 21 of the small pellet 1, the relief central portion 211 of the top surface 21 keeping the plate 190 a stable position in the center of the small pellet 1. Comestible goods may then be placed on the plate 190 followed by a dome 194 as seen in FIG. 42. The dome 194 is sufficiently sized and shaped to be disposed around the circumference of the plate 190 yet still within the circumference of the tray 192 upon which it rests. The dome 194 also comprises a handle 202 defined into its outer surface which allows a user to easily remove the dome 194 and expose the plate 190 and comestible goods therein. Both the tray 192 and dome 194 serve as an additional insulation barrier that prevents heat from radiating from the small pellet 1, thus keeping the comestible goods sufficiently heated for an increased amount of time than would otherwise be possible.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicit contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus for maintaining comestible goods at an elevated temperature comprising:
    a re-heatable body, the body comprising a circular top surface and a circular bottom surface;
    a plurality of power pins disposed in the body between the top surface and bottom surface;
    a plurality of loop pins disposed in the body adjacent to the power pins; and
    a filament coupled to the power pins and thermally coupled to the top surface of the body,
    wherein the body further comprises:
        a plurality of rails disposed on the bottom surface, the rails comprising means for maintaining the body a fixed distance away from an adjacent surface in which it is disposed upon;
        a notch defined into its peripheral edge beneath the top surface and above the center of the recess defined into the body; and
        a plurality of male components disposed symmetrically around the circumference of the body, the male components comprising means for coupling the body to an underliner,
    wherein the underliner comprises:
        a border comprising an inner radius and an outer radius;
        an access port defined in an arc segment of the border;
        a notch aperture defined in the border above the center of the access port; and
        a plurality of female apertures defined symmetrically around the circumference of the inner radius of the border, the female apertures comprising means for coupling with the male components disposed on the body.

2. The apparatus of claim 1 where the re-heatable body further comprises a plurality of gripping portions defined into its top and bottom surfaces, the gripping portions being defined at peripheral edges of the body.

3. The apparatus of claim 2 where the plurality of power pins and loop pins are disposed within a recess defined into the body above and below the bottom surface and top surface respectively, the top and bottom surfaces extending beyond the length of the plurality of power pins and loop pins.

4. The apparatus of claim 3 where the bottom surface comprises a notch defined into its peripheral edge beneath the center of the recess defined into the body.

5. The apparatus of claim 1 where the filament is thermally coupled to the top surface of the body in a symmetrical pattern across the diameter of the top surface.

6. The apparatus of claim 1 further comprising a plurality of guide pins disposed on the body, at least one guide pin being adjacently disposed to at least one power pin and at least one guide pin being adjacently disposed to at least one loop pin.

7. The apparatus of claim 1 where the body further comprises a plurality of knobs disposed on the bottom surface, the knobs comprising means for maintaining the body a fixed distance away from an adjacent surface in which it is disposed upon.

8. The apparatus of claim 1 where the plurality of power pins and loop pins are disposed within a recess defined into the body below the top surface, the top surface extending beyond the length of the plurality of power pins and loop pins.

9. An apparatus for heating a plurality of re-heatable elements used to maintain comestible goods at an elevated temperature comprising:
    a pair of side walls coupled to a base;
    a back portion coupled between to the pair of side walls;
    a top portion coupled across the top of the side walls and back portion;
    a plurality of shelves disposed between the side walls;
    a plurality of sockets coupled to the back portion, at least two sockets being coupled to the back portion at adjacent positions to each other for each of the plurality of shelves;
    a re-heatable body, the body comprising a circular top surface and a circular bottom surface;
    a plurality of power pins disposed in the body between the top surface and bottom surface;
    a plurality of loop pins disposed in the body adjacent to the power pins;
    a filament coupled to the power pins and thermally coupled to the too surface of the body; and
    a controller board coupled to the plurality of sockets, the controller board comprising means for regulating the amount of electric current that is delivered by each of the sockets,
    wherein each of the plurality of shelves comprise means for accommodating and supporting up to two re-heatable elements when they are coupled to their corresponding sockets,
    wherein the controller board and plurality of sockets comprise means for detecting when a re-heatable element has been inserted into the apparatus and electrically coupled to one of the plurality of sockets, wherein the controller board and plurality of sockets comprise means for supplying an electric current to the plurality of re-heatable elements only after the insertion of the corresponding socket into each of the re-heatable elements has been detected, and wherein the controller board comprises means for recording the operational history of each of the plurality of sockets and means for downloading the operational history of each of the plurality of sockets into an external computer.

10. The apparatus of claim 9 where each of the plurality of sockets comprise means for mechanically and electrically coupling to the corresponding plurality of re-heatable elements.

11. A system for heating a plurality of re-heatable large or small pellets used to maintain comestible goods at an elevated temperature comprising:

a charging unit;

a plurality of shelves disposed within the charging unit;

a plurality of sockets disposed within the charging unit, at least two sockets being disposed at the rear of each shelf disposed within the charging unit; and a controller board within the charging unit and electrically coupled to the plurality of sockets;

wherein the plurality of shelves are reversible and comprise means for accommodating the large re-heatable pellets coupled to an underliner on one surface and means for accommodating the small re-heatable pellets in an inverted position on its opposing surface; and a tray and a dome for enveloping at least one small pellet after being heated by means of the charging unit, wherein each of the plurality of sockets comprise a plurality of guide plugs, each of the guide plugs comprising means for mechanically coupling to a corresponding plurality of guide pins disposed on the small or large pellets and a plurality of loop plugs and power plugs, each of the loop plugs and power plugs comprising means for electrically coupling to a corresponding plurality of loop pins and power pins disposed on the small or large pellets, wherein the plurality of power plugs further comprise means for establishing an electrical coupling with the corresponding power pins of the small or large pellet before the loop plugs are electrically coupled to the loop pins of the same small or large pellet, and wherein each of the plurality of sockets comprise a male component, the male component comprising means for being inserted into a corresponding notch defined within the small or large pellet.

12. The system of claim 11 where the charging unit comprises a plurality of pellet status lights, wherein at least one pellet status light is disposed on the charging unit on either side and adjacent to a corresponding shelf disposed within the charging unit.

13. The system of claim 12 where the plurality of pellet status lights are regulated by the controller board and where the plurality of pellet status lights comprise means for indicating whether or not the small or large pellet has been heated by means of the charging unit.

14. A method for heating a pellet used for maintaining comestible goods at an elevated temperature comprising:

inserting at least one pellet into a charging unit;

coupling the at least one pellet to at least one socket disposed within the charging unit;

detecting the presence of the at least one pellet at a specific location within the charging unit;

supplying a flow of electric current to the at least one pellet through the at least one socket;

heating the pellet;

discontinuing the flow of electric current to the at least one pellet through the at least socket; and removing the at least one pellet from the charging unit, wherein coupling the at least one pellet to at least one socket disposed within the charging unit comprises:

inserting a pair of power pins disposed on the at least one pellet into a corresponding pair of power plugs defined within the at least one socket;

inserting a pair of loop pins adjacently disposed on the at least one pellet next to the power pins into a corresponding pair of loop plugs defined within the at least one socket;

inserting a pair of guide pins disposed on the at least one pellet into a corresponding pair of guide plugs defined within the at least one socket; and electrically coupling the power pins to the power plugs before electrically coupling the loop pins to the loop plugs, wherein detecting the presence of the at least one pellet at a specific location within the charging unit comprises:

completing a circuit with a detection shunt disposed within the at least one socket by insertion of the loop pins into the loop plugs; and sending a signal to a controller board within the charging unit that the at least one pellet has been detected at a specific socket location within the charging unit, and wherein removing the at least one pellet from the charging unit comprises electrically decoupling the loop pins from the loop plugs before electrically decoupling the power pins from the power plugs.

15. The method of claim 14 where inserting the at least pellet into the charging unit comprises:

inserting a pair of rails disposed on a bottom surface of the at least one pellet into a corresponding pair of troughs defined in a horizontal shelf disposed within the charging unit; and sliding the at least one pellet distally across the shelf towards a back portion of the charging unit.

16. The method of claim 14 where inserting the at least one pellet into the charging unit comprises:

inverting the at least one pellet and exposing a bottom surface of the at least one pellet;

inserting the at least one inverted pellet between a pair of ridges disposed on a horizontal shelf disposed within the charging unit; and sliding the at least one pellet distally across the shelf towards a back portion of the charging unit.

17. The method of claim 14 where supplying a flow of electric current to the at least one pellet through the socket comprises:

sending the flow of electric current to the power plugs defined within the at least one socket after the completion of the circuit with the detection shunt; and conducting the flow of electric current from the power plugs to the power pins disposed on the at least one pellet.

18. The method of claim 17 where heating the at least one pellet comprises:

conducting the flow of electric current from the power pins to a filament disposed within a body of the at least one pellet;

resistively heating the filament by means of the electric current; and thermally transferring heat generated by the filament to a top surface of the at least one pellet.

19. The method of claim 17 where discontinuing the flow of electric current to the at least one pellet through the at least one socket comprises:

breaking the completed circuit with the detection shunt disposed within the at least one socket; and stopping the flow of electric current to the power plugs defined within the at least one socket.

20. The method of claim 17 where discontinuing the flow of electric current to the at least one pellet through the at least one socket comprises stopping the flow of electric current to the power plugs after a predetermined amount of time has elapsed as determined by the controller board.

21. The method of claim 14 further comprising cycling the flow of electric current supplied to the at least one pellet on and off for predetermined amounts of time as determined by a controller board coupled to the at least one socket.

22. The method of claim 14 further comprising powering down the charging unit after a predetermined amount of time of inactivity has elapsed as determined by a controller board coupled to the at least one socket.

* * * * *